United States Patent
DeLucca

(10) Patent No.: US 9,055,736 B1
(45) Date of Patent: *Jun. 16, 2015

(54) BARE HOOK/LOST BAIT ALARM

(76) Inventor: Thaddeus DeLucca, Harahan, LA (US)

( * ) Notice: Subject to any disclaimer, the term of this patent is extended or adjusted under 35 U.S.C. 154(b) by 927 days.

This patent is subject to a terminal disclaimer.

(21) Appl. No.: 13/194,490

(22) Filed: Jul. 29, 2011

Related U.S. Application Data

(63) Continuation-in-part of application No. 12/476,111, filed on Jun. 1, 2009, now Pat. No. 8,161,678, which is a continuation-in-part of application No. 12/408,384, filed on Mar. 20, 2009, now abandoned, which is a continuation-in-part of application No. 12/272,340, filed on Nov. 17, 2008, now abandoned, which is a continuation-in-part of application No. 11/331,440, filed on Jan. 11, 2006, now abandoned.

(60) Provisional application No. 60/642,789, filed on Jan. 11, 2005, provisional application No. 60/988,159, filed on Nov. 15, 2007, provisional application No. 61/370,746, filed on Aug. 4, 2010.

(51) Int. Cl.
*A01K 93/02* (2006.01)

(52) U.S. Cl.
CPC ..................................... *A01K 93/02* (2013.01)

(58) Field of Classification Search
CPC ..... A01K 93/02; A01K 97/125; A01K 91/06; A01K 93/00; A01K 83/00; A01K 83/06
See application file for complete search history.

(56) References Cited

U.S. PATENT DOCUMENTS

| | | | |
|---|---|---|---|
| 1,752,397 A | 4/1930 | See | |
| 1,823,937 A * | 9/1931 | Hatchett, Sr. | ..................... 43/17 |
| 2,157,003 A | 5/1939 | Mussina | |
| 2,331,665 A | 10/1943 | Douglas et al. | |
| 2,490,669 A | 12/1949 | Burke | |
| 2,493,971 A | 1/1950 | Johnson | |
| 2,542,132 A | 2/1951 | Goertzen | |
| 2,575,852 A | 11/1951 | Trowbridge | |
| 2,587,190 A | 2/1952 | Merriweather | |
| 2,790,263 A | 4/1957 | Chaney | |
| 2,808,678 A | 10/1957 | Leonardi | |
| 3,010,238 A | 11/1961 | Crumrine, Jr. et al. | |
| 3,105,318 A | 10/1963 | Birrell | |
| 3,461,592 A | 8/1969 | Makino | |
| 3,766,680 A | 10/1973 | Torme et al. | |
| 3,832,795 A | 9/1974 | Wolfe | |
| 4,270,298 A | 6/1981 | Hodshire | |
| 4,461,114 A | 7/1984 | Riead | |
| 4,565,024 A | 1/1986 | Maerz | |
| 4,625,446 A | 12/1986 | Morimoto | |

(Continued)

FOREIGN PATENT DOCUMENTS

| | | |
|---|---|---|
| DE | 3714124 A1 | 11/1987 |
| GB | 2245467 A | 1/1992 |

(Continued)

*Primary Examiner* — David Parsley
*Assistant Examiner* — Danielle Clerkley
(74) *Attorney, Agent, or Firm* — Garvey, Smith, Nehrbass & North, L.L.C.; Charles C. Garvey, Jr.; Seth M. Nehrbass

(57) ABSTRACT

A bait and hook arrangement is coupled with a mechanism that alerts a fisherman when his or her bait article is no longer attached to the hook. When the bait is off the hook, (empty hook), the mechanism is triggered.

25 Claims, 20 Drawing Sheets

(56) References Cited

U.S. PATENT DOCUMENTS

| | | |
|---|---|---|
| 4,662,099 A | 5/1987 | Stewart |
| 5,033,222 A | 7/1991 | Chang |
| 5,199,205 A | 4/1993 | Klammer |
| 5,228,228 A | 7/1993 | Meissner |
| 5,351,431 A | 10/1994 | Ryu |
| 5,351,432 A | 10/1994 | Tse |
| 5,581,930 A | 12/1996 | Langer |
| 5,615,512 A | 4/1997 | Wang |
| 5,784,829 A | 7/1998 | Latta |
| 5,819,465 A | 10/1998 | Bryant |
| 5,829,181 A | 11/1998 | Fielder et al. |
| 5,898,372 A | 4/1999 | Johnson et al. |
| 5,937,566 A | 8/1999 | Buczkowski et al. |
| 5,950,348 A | 9/1999 | Gruel |
| 5,974,721 A | 11/1999 | Johnson et al. |
| 6,079,144 A | 6/2000 | Morgan et al. |
| 6,138,398 A | 10/2000 | Livingston |
| 6,397,510 B1 | 6/2002 | Klein |
| 6,671,994 B1 | 1/2004 | Klein |
| 6,763,629 B1 | 7/2004 | Bennett |
| 6,796,077 B1 | 9/2004 | Dupree et al. |
| 6,880,283 B2 | 4/2005 | Holmes |

FOREIGN PATENT DOCUMENTS

| | | |
|---|---|---|
| GB | 2249007 A | 4/1992 |
| GB | 2390965 A | 1/2004 |
| JP | 05137488 A | 6/1993 |
| WO | WO 8800436 A1 | 1/1988 |

* cited by examiner

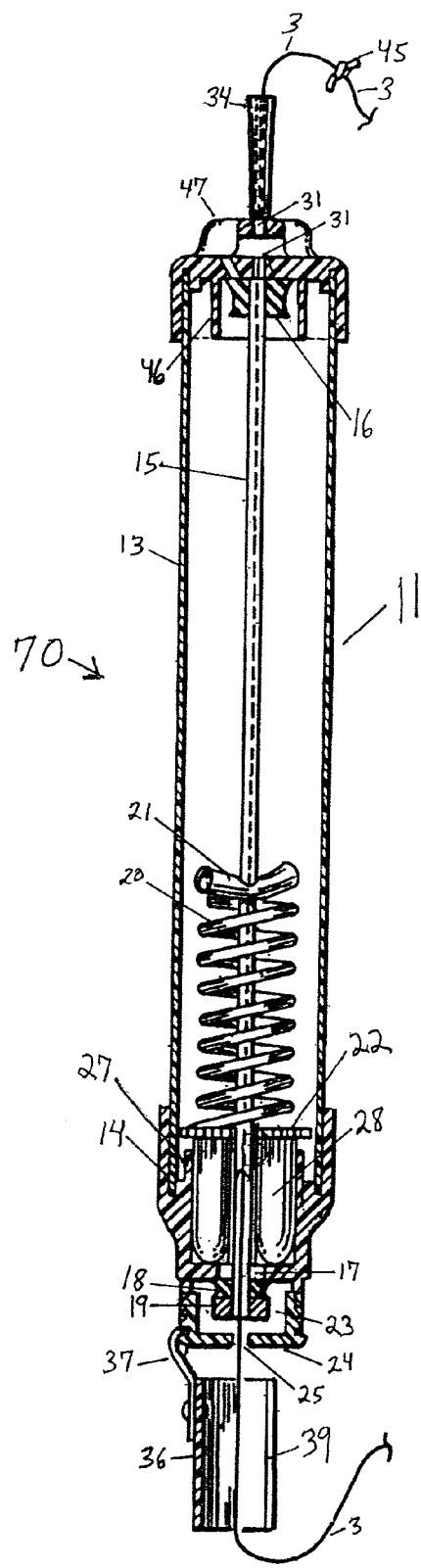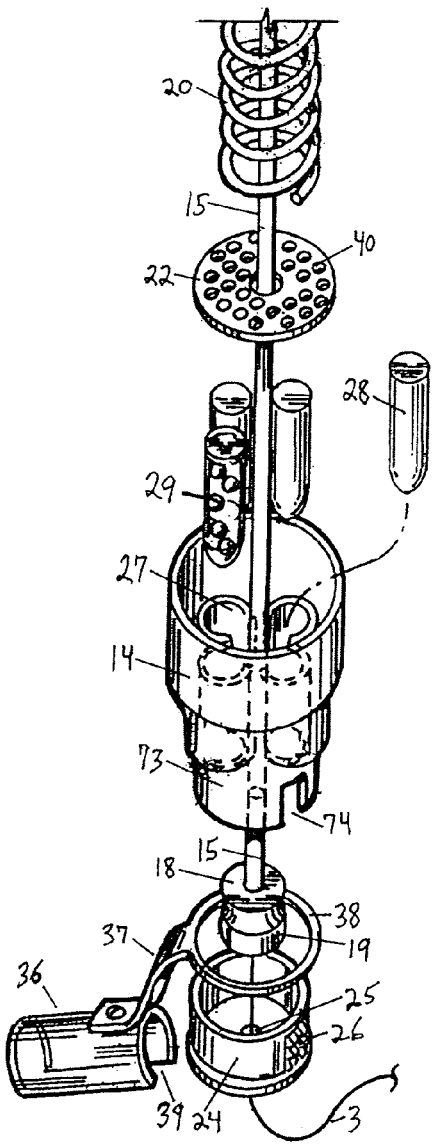
FIG. 2.
FIG. 3.

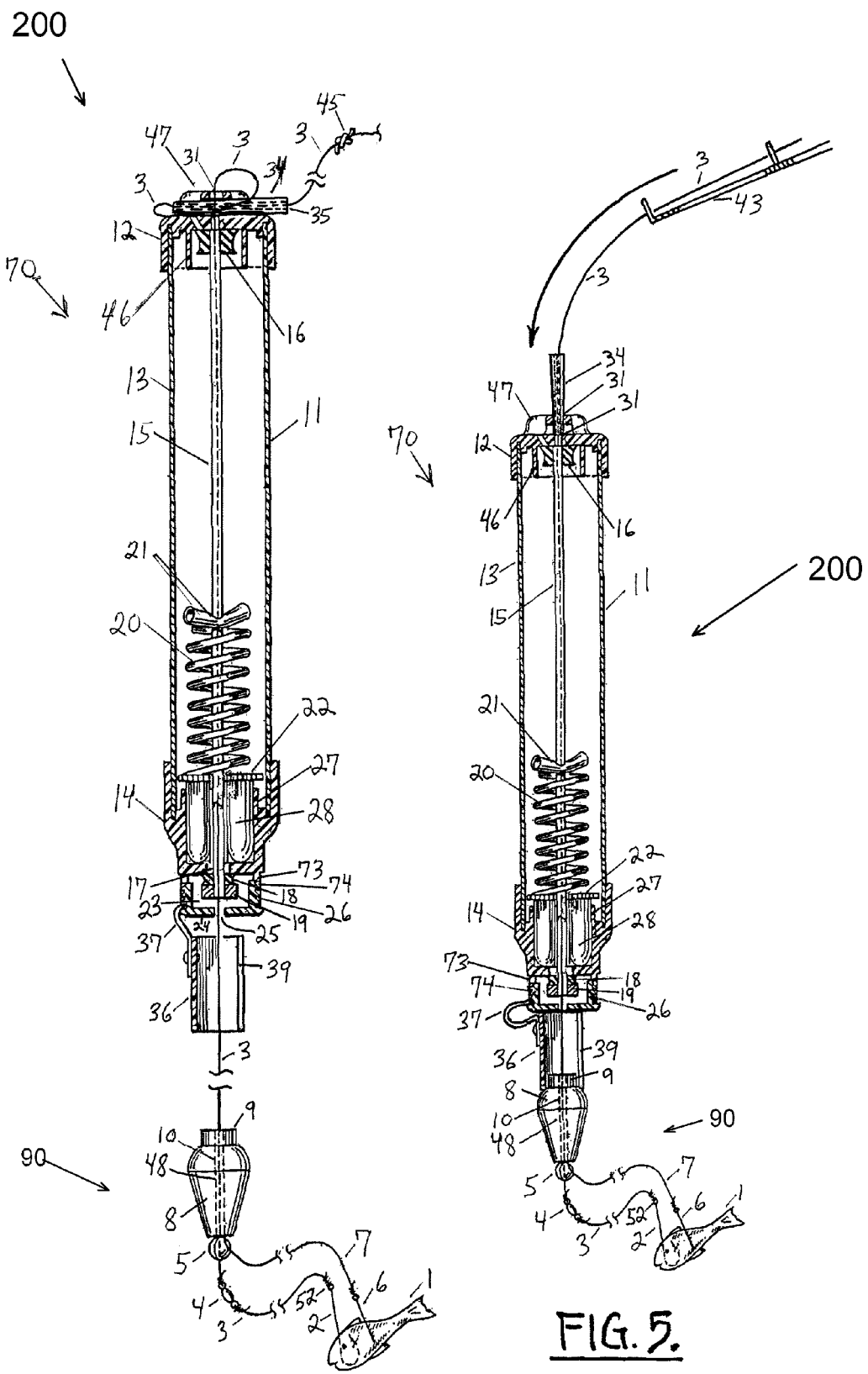

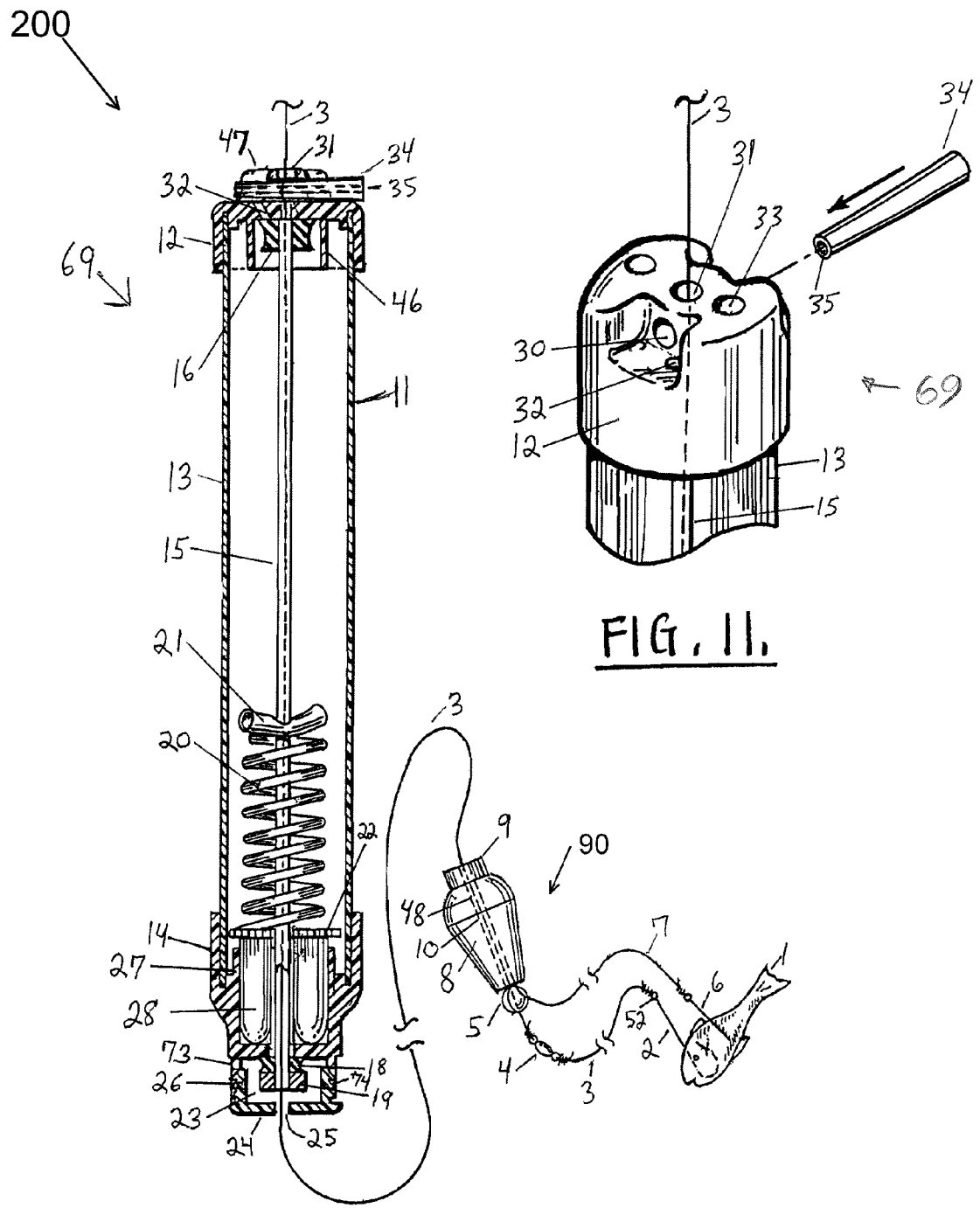

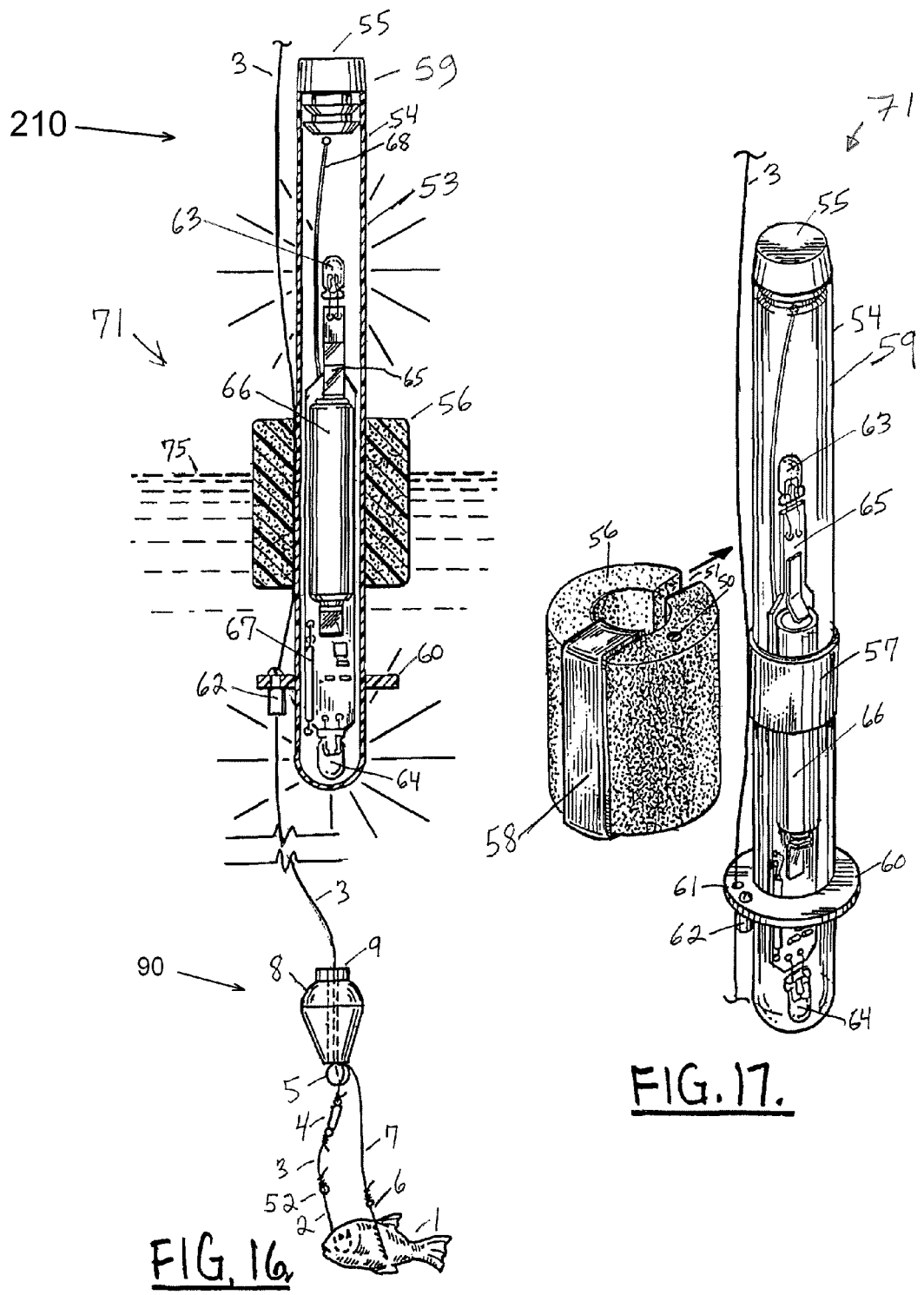

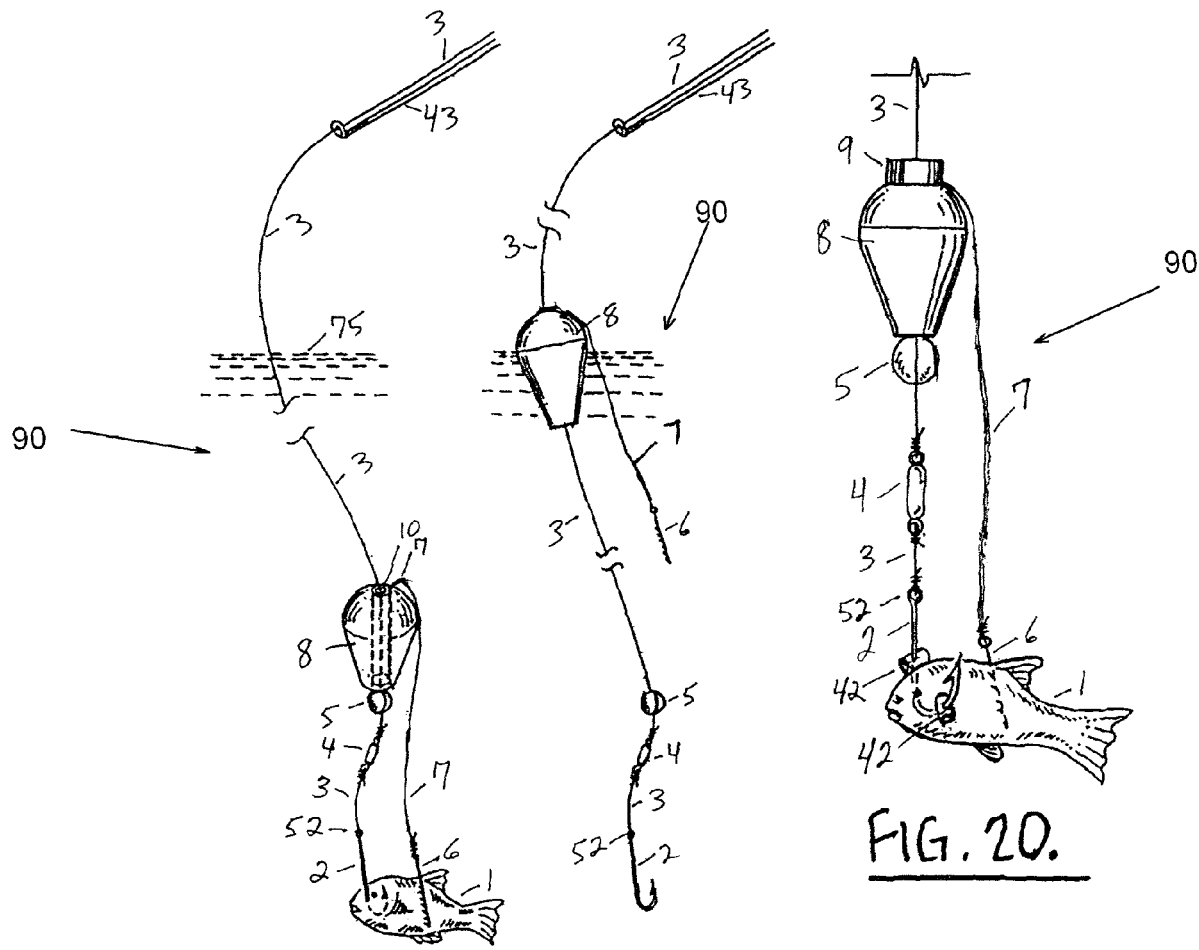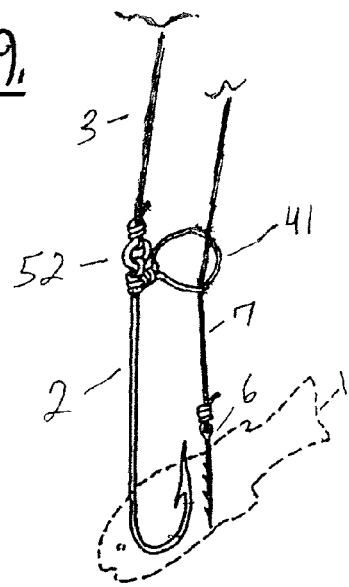
FIG. 18. FIG. 19. FIG. 20. FIG. 21.

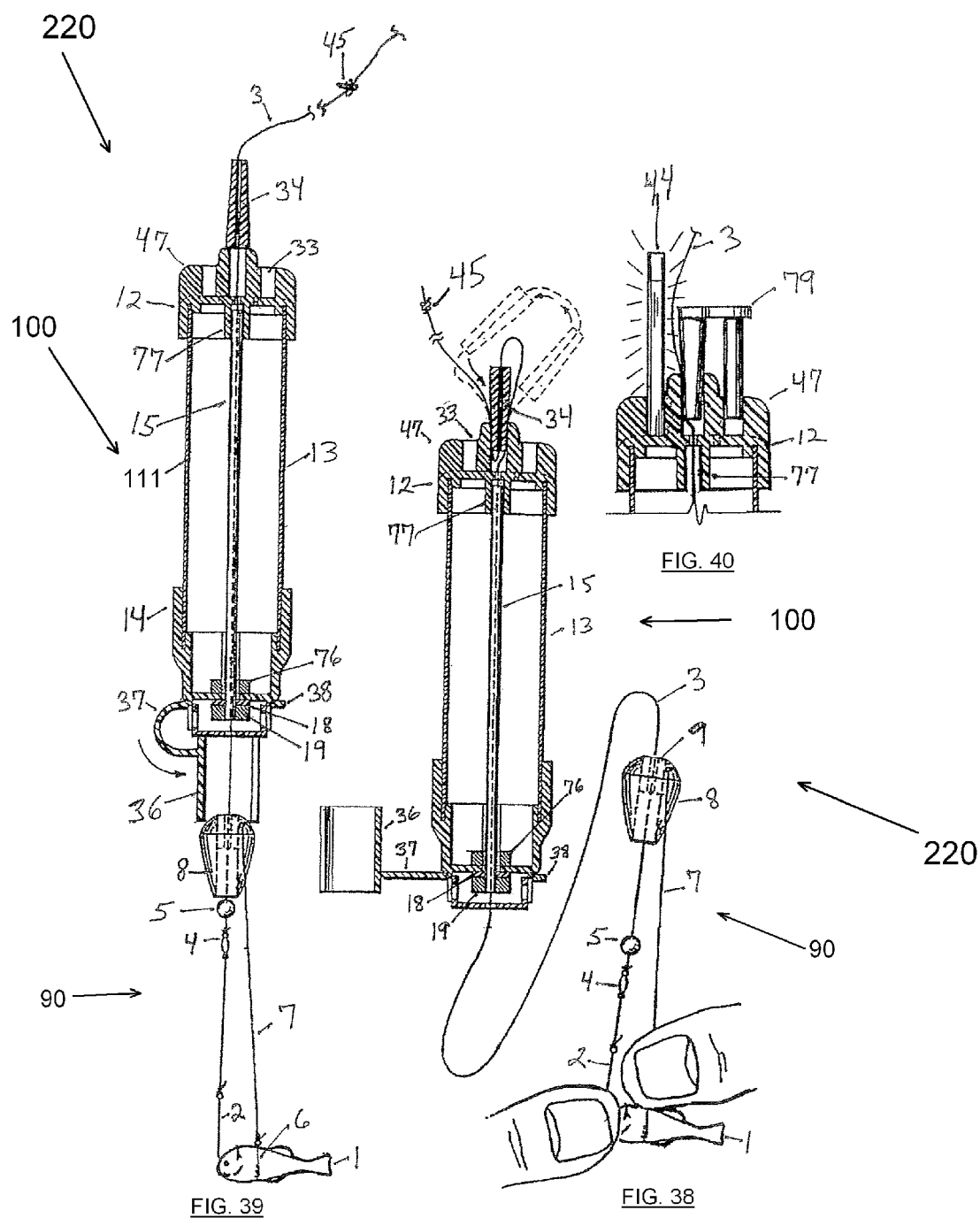

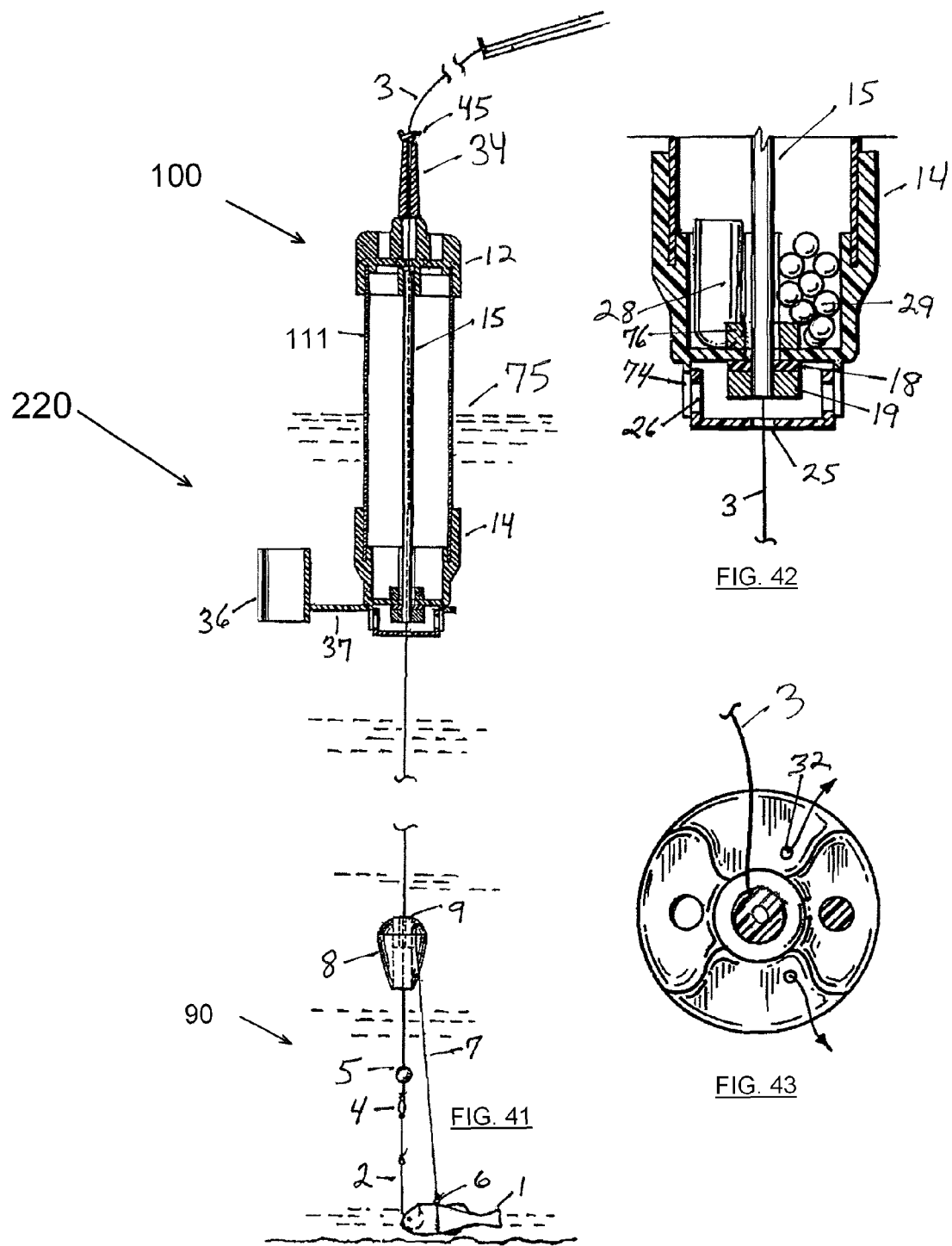

BARE HOOK/LOST BAIT ALARM

CROSS-REFERENCE TO RELATED APPLICATIONS

This is a continuation-in-part of U.S. patent application Ser. No. 12/476,111, filed 1 Jun. 2009, which is a continuation-in-part of U.S. patent application Ser. No. 12/408,384, filed 20 Mar. 2009, which is a continuation-in-part of U.S. patent application Ser. No. 12/272,340, filed 17 Nov. 2008, which is a continuation-in-part of my U.S. patent application Ser. No. 11/331,440, filed 11 Jan. 2006, all of which are incorporated herein by reference.

Priority of my U.S. Provisional Patent Application Ser. No. 61/370,746, filed 4 Aug. 2010, incorporated herein by reference, is hereby claimed.

My U.S. Provisional Patent Application Ser. No. 60/642,789, filed 11 Jan. 2005, is incorporated herein by reference.

My U.S. Provisional Patent Application Ser. No. 60/988,159, filed 15 Nov. 2007, is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

This invention relates to fishing with bait, such as live bait (minnows, shrimp, small fish), or dead bait or manufactured or synthetic. More particularly, the present invention relates to a method and apparatus that alerts a fisherman that his or her hook is bare, no longer baited.

2. General Background of the Invention

Fisherman often attempt to lure fish to a hook using a bait article that can be either live bait or dead bait. Bait is understood to mean anything that can be placed on a hook to attract a fish. Examples of live bait include minnows, shrimp, small fish, worms, insects or the like. Examples of dead bait include frozen or cooled items such as shrimp, fish, and insects as examples. The website of Bass Pro Shops (www.basspro.com) gives examples of many baits. Some bait articles can be attached to the hook which are neither live nor fresh/frozen but are plastic or other synthetic material, sometimes referred to as trailers. Bass Pro Shops also sells preserved baits that could be attached to a hook such as, for example eggs, worms, dough, and the like.

One of the problems facing a fisherman is the loss of a bait article while fishing. These bait articles can become dislodged from the hook that supports them because of a number of different reasons. In some situations, a smaller fish simply removes the bait from the hook without becoming impaled. Sometimes a fish will strike, remove the bait, and not be impaled by the hook. In some situations, tide flow slowly pulls at the bait until it becomes disconnected from the hook. In some situations, the bait can be removed from the hook because of underwater structure such as grass, sticks, limbs, gravel and the like. Sometimes bait will fall off the hook when the angler makes his cast.

If the fisherman has some doubt whether or not the bait is still connected to the hook, he or she typically has only one option, namely reeling in the hook and checking it out.

If the bait is still on the hook, it was needlessly removed from the fishing area, reducing the chances of catching a fish. If the hook was bare, a fisherman must wonder how long it was bare and are the fish still in the vicinity or did they move on because there was no more bait to entice them. There remains a need for a device to let an angler know immediately when there is no longer any bait on the hook. Modern fishing can be boiled down to a time management endeavor. Since one cannot fish 24 hours a day, seven days a week, an angler must, in the limited time available for him, 1) find a location where the fish are, 2) be at that location when they are ready to feed, 3) present to the fish a bait they feel like eating and 4) keep a bait in the feeding area as much as possible during their active feeding times. There is only a certain amount of time during the day when at a given location, there will be actively feeding fish. If an angler is lucky enough to be at the right spot, at the right time, with the right bait on the hook, the odds of a successful fishing trip are in his favor, and are increased the greater the time a baited hook is in the water.

Reeling the line in to check for a baited hook decreases efficiency. Repeatedly casting the bait can stun or kill it, making it less attractive to the fish.

None of the previous art answers one of the most basic questions of bait fishing: Is there still bait on the hook? The key to solving the problem and increasing an angler's efficiency and enjoyment, is to be able to know when a hook no longer has bait on it without having to remove it from the strike area.

The following patent documents are incorporated herein by reference:

U.S. Pat. Nos. 4,461,114 5,351,432 5,615,512 5,937,566 5,974,721 6,079,144 6,796,077;

U.K. Patent No. GB 2245467.

U.S. Pat. No. 5,974,721 discloses a light emitting fishing float that is activated when a fish contacts the hook.

U.S. Pat. No. 6,079,144 discloses a motion-actuated light with a fish hook and float that flashes when contact is made with spaced conductive areas that form a circuit.

U.S. Pat. No. 6,796,077 discloses a lighted lure with a conductive weed guard that turns off when a fish is hooked.

U.S. Pat. No. 4,625,446 is directed to fish bite by pressure sensor.

U.S. Pat. No. 5,581,930 is a remote activity sensing system.

U.S. Pat. No. 6,671,994 discloses a fish strike indicator.

U.S. Pat. No. 6,138,398 discloses a fish strike indicator.

U.S. Pat. No. 5,898,372 discloses a lighted fishing float with a motion detector.

BRIEF SUMMARY OF THE INVENTION

The present invention employs floats and a hook with a float assembly connected to the bait. When bait is no longer on the hook, the float is released, and either alerts the fisherman that his or her bait is gone by floating to the surface, or interacts with a surface signal float to alert the angler.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a sectional elevation view of an embodiment of the apparatus of the present invention;

FIG. 3 is a partial exploded perspective view of an embodiment of the apparatus of the present invention;

FIG. 4 is a sectional elevation view of an embodiment of the apparatus of the present invention;

FIG. 5 is a sectional elevation view of an embodiment of the apparatus of the present invention;

Signal Float-Sliding Rig Deployed Configuration

Figures 6, 7:
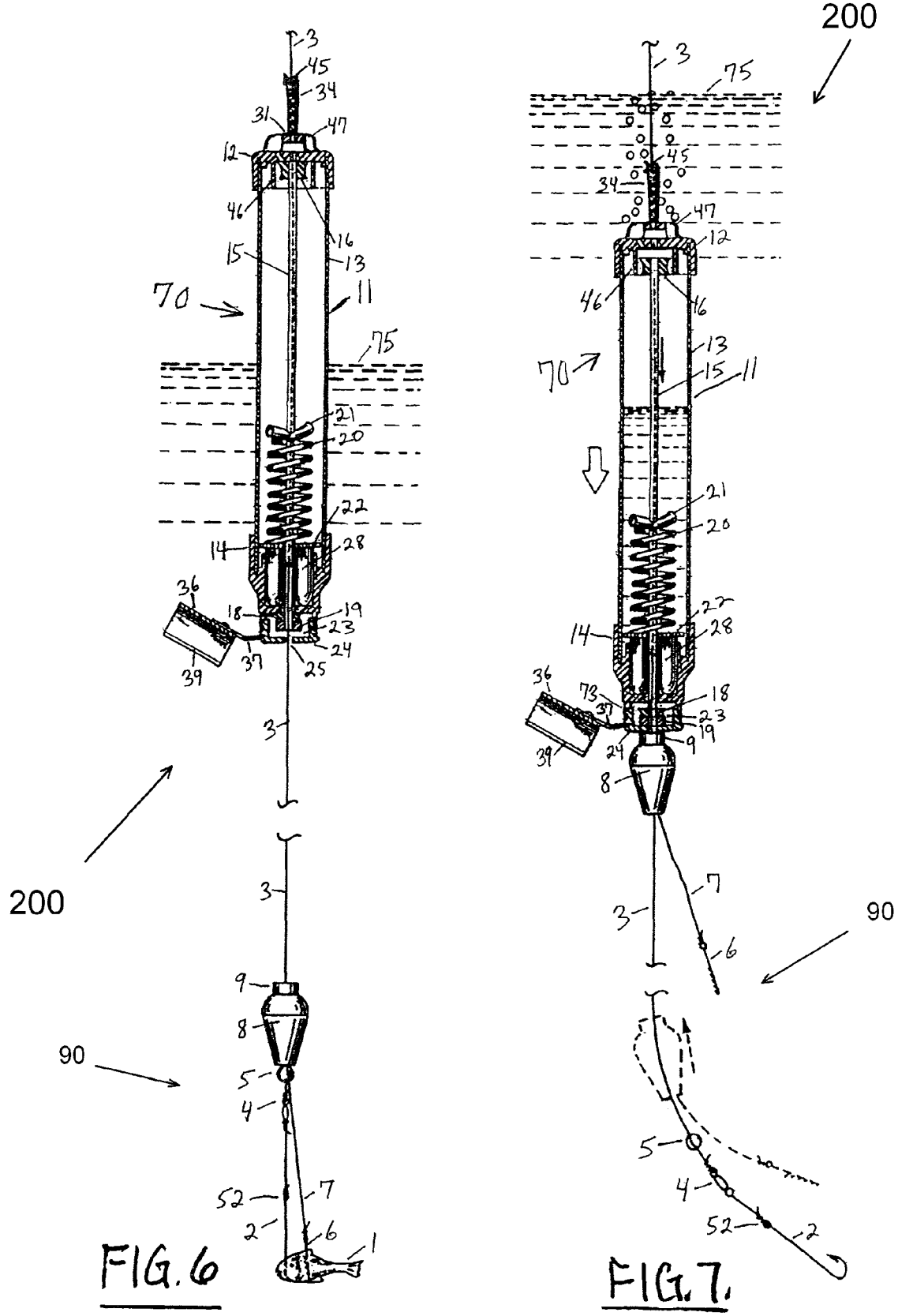
FIG. 6 is an elevation view of an embodiment of the apparatus of the present invention.
Figures 8, 9:
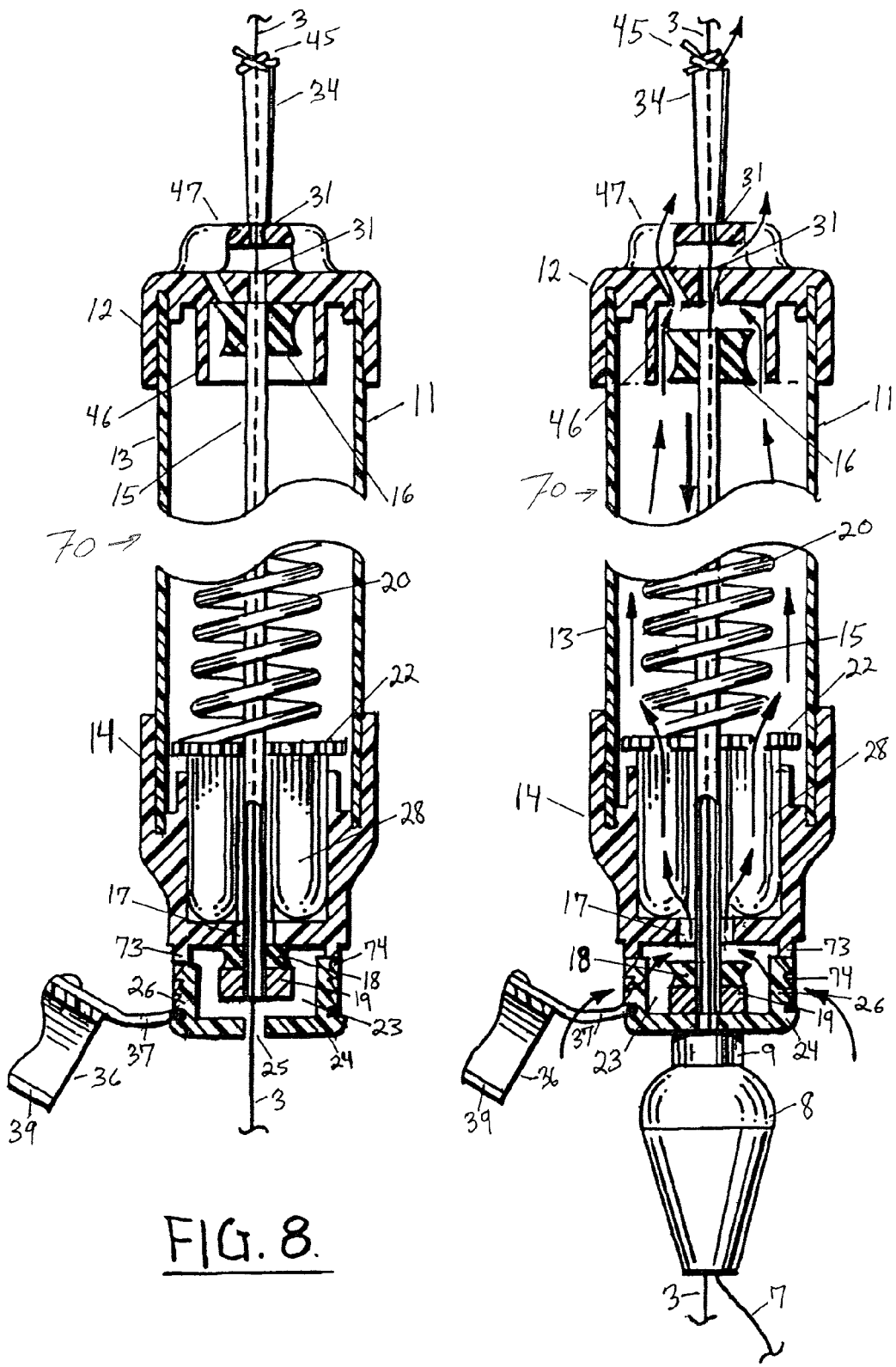
Figure 12:
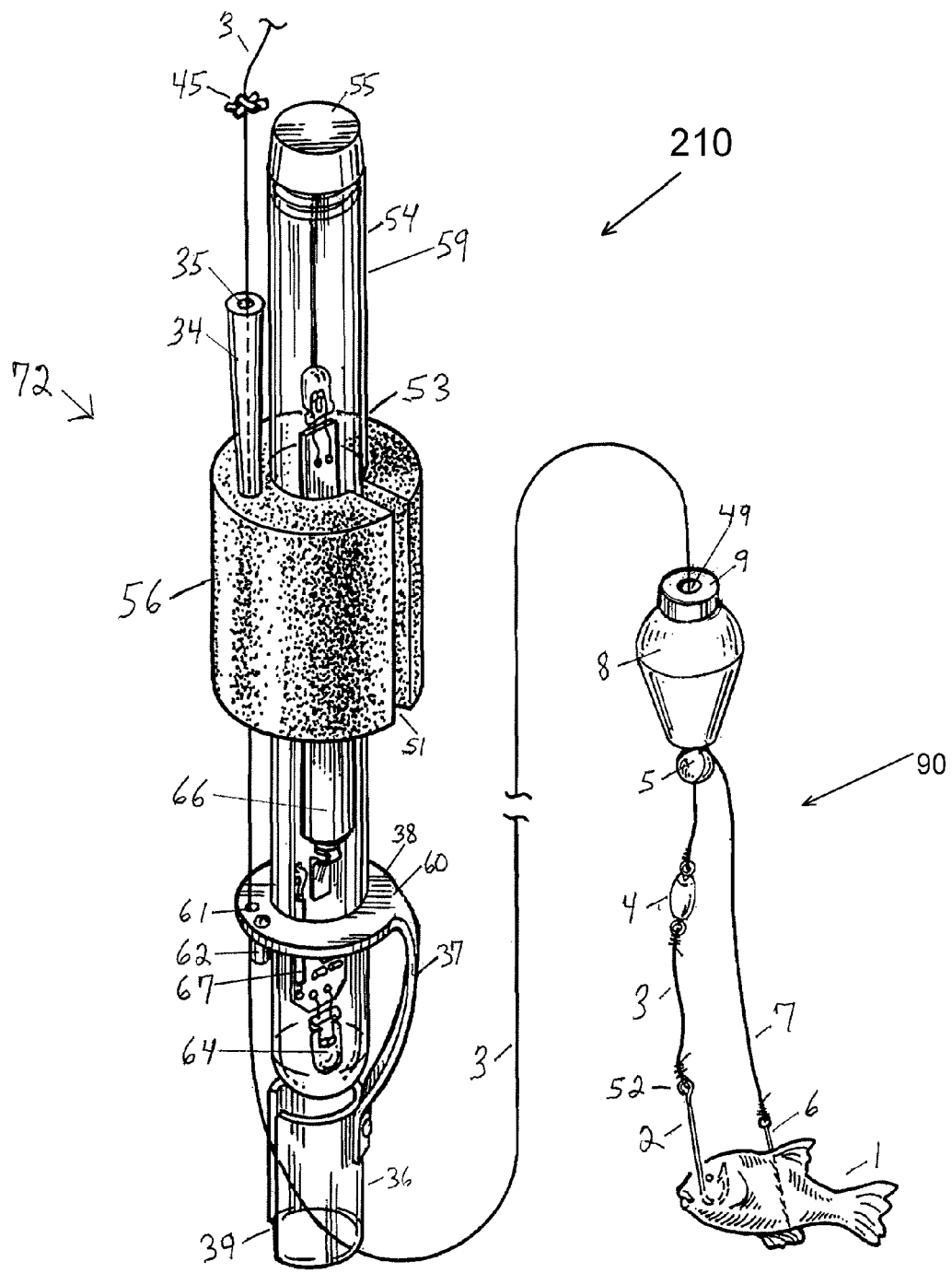
Figure 13:
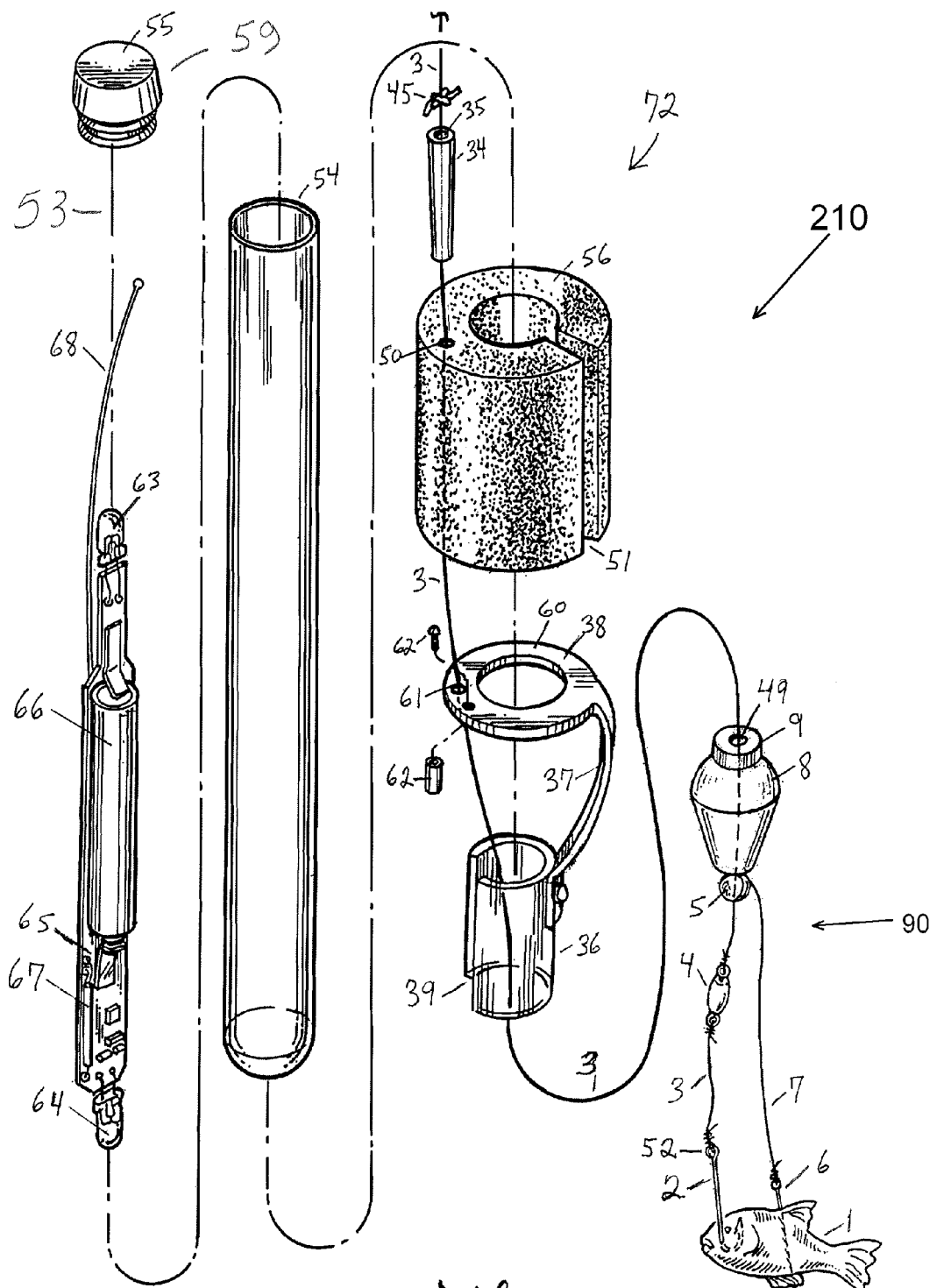
Figure 14:
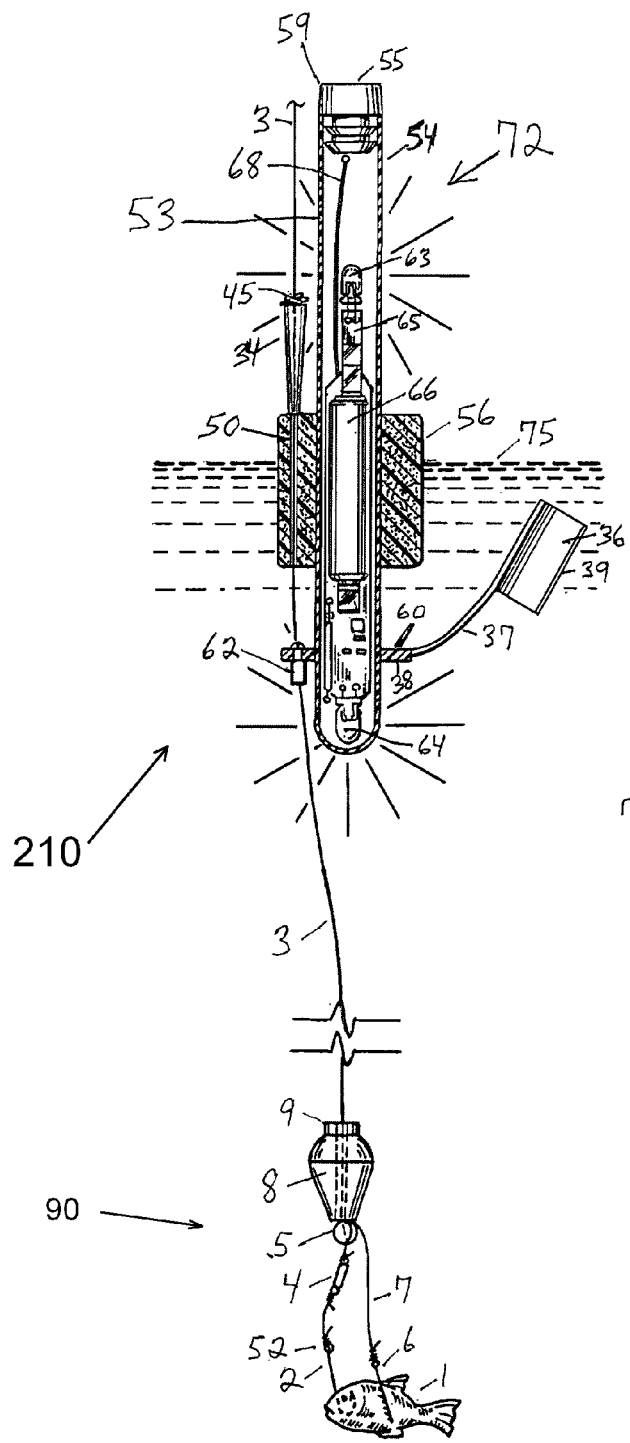
Figure 15:
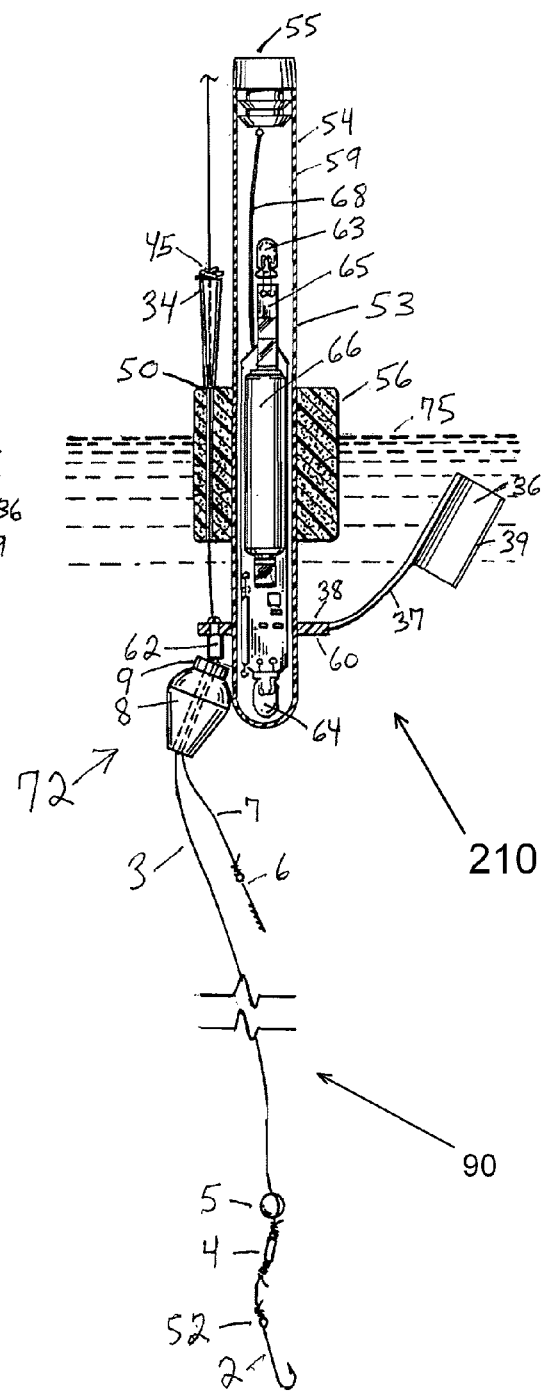
Figure 22:
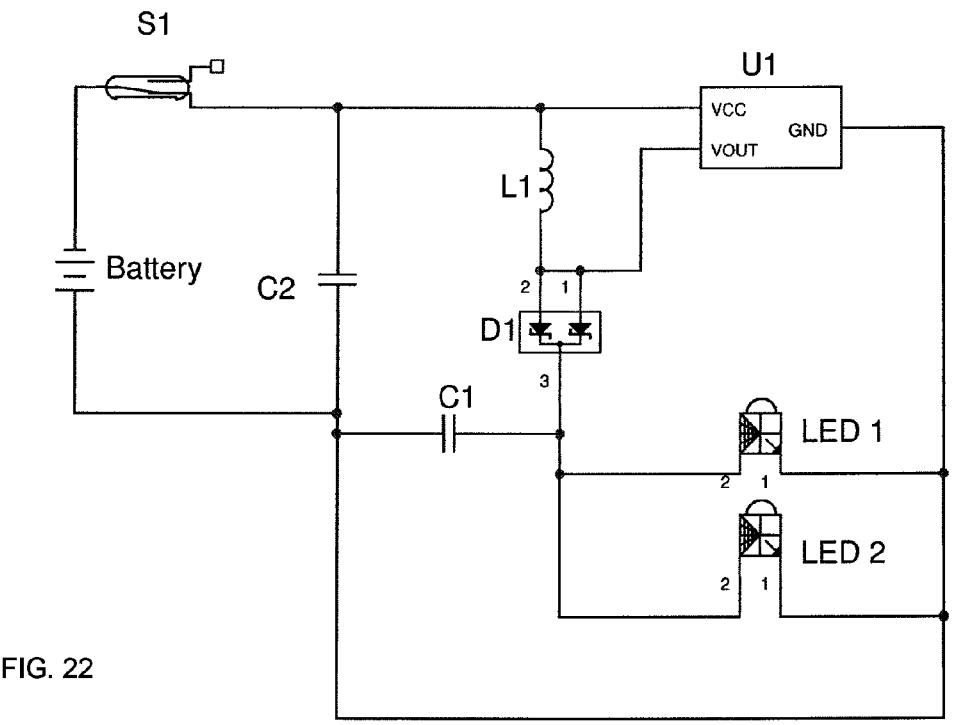
Figure 23:
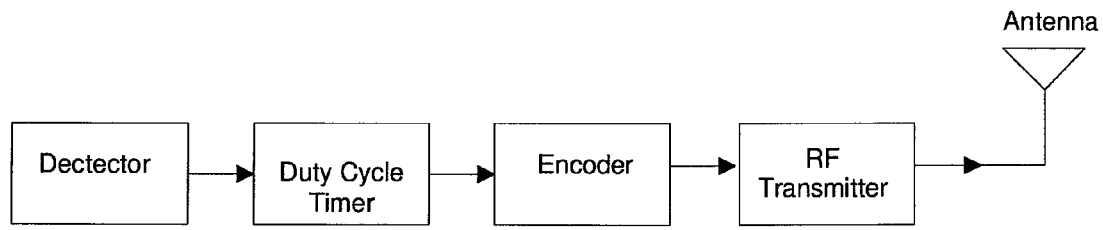
Figure 24:
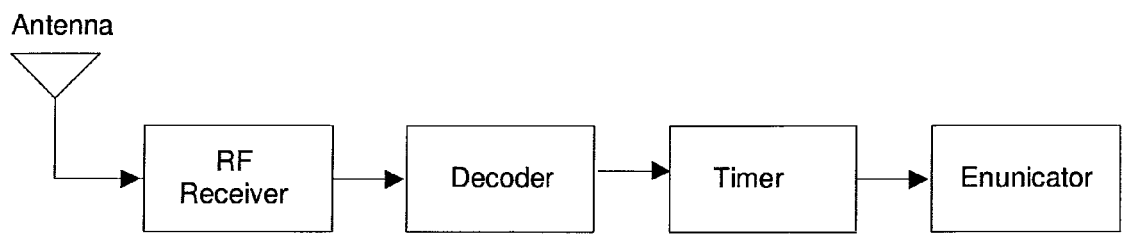

FIG. 7 is an elevation view of an embodiment of the apparatus of the present invention;

FIG. 8 is a partial sectional elevation view of an embodiment of the apparatus of the present invention;

FIG. 9 is a partial sectional elevation view of an embodiment of the apparatus of the present invention;

FIG. 10 is a sectional elevation view of an embodiment of the apparatus of the present invention;

FIG. 11 is a partial perspective view of an embodiment of the apparatus of the present invention;

FIG. 12 is a partial perspective view of an embodiment of the apparatus of the present invention;

FIG. 13 is an exploded perspective view of an embodiment of the apparatus of the present invention;

FIG. 14 is a sectional elevation view of an embodiment of the apparatus of the present invention;

FIG. 15 is a sectional elevation view of an embodiment of the apparatus of the present invention;

FIG. 16 is a sectional elevation view of an embodiment of the apparatus of the present invention;

FIG. 17 is a partially exploded partial perspective view of an embodiment of the apparatus of the present invention;

FIG. 18 is a partial sectional elevation view of an embodiment of the apparatus of the present invention;

FIG. 19 is a partial elevation view of an embodiment of the apparatus of the present invention;

FIG. 20 is a partial elevation view of an embodiment of the apparatus of the present invention;

FIG. 21 is a partial elevation view of an embodiment of the apparatus of the present invention;

FIG. 22-24 are circuit diagrams showing parts of an embodiment of the apparatus of the present invention.

Figure 25:
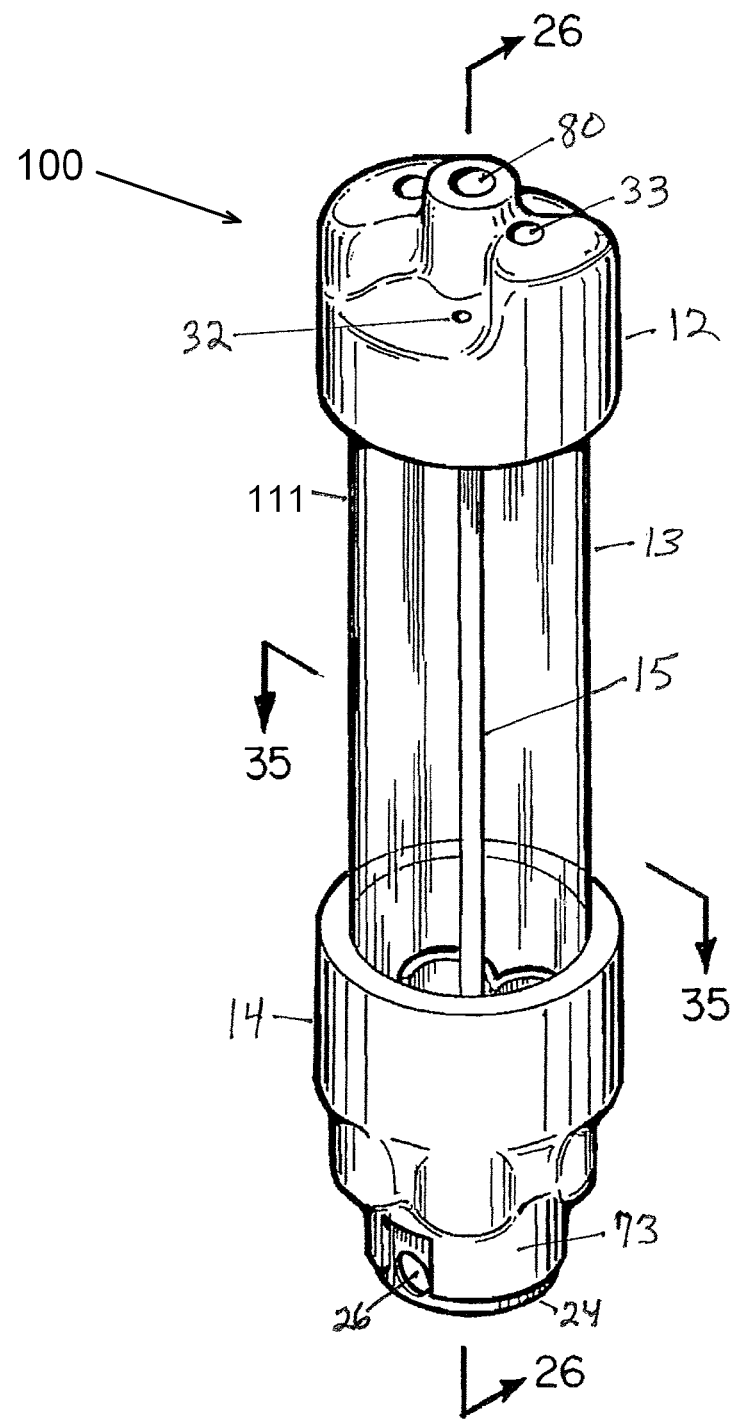
Figures 26, 27, 28, 29, 30:
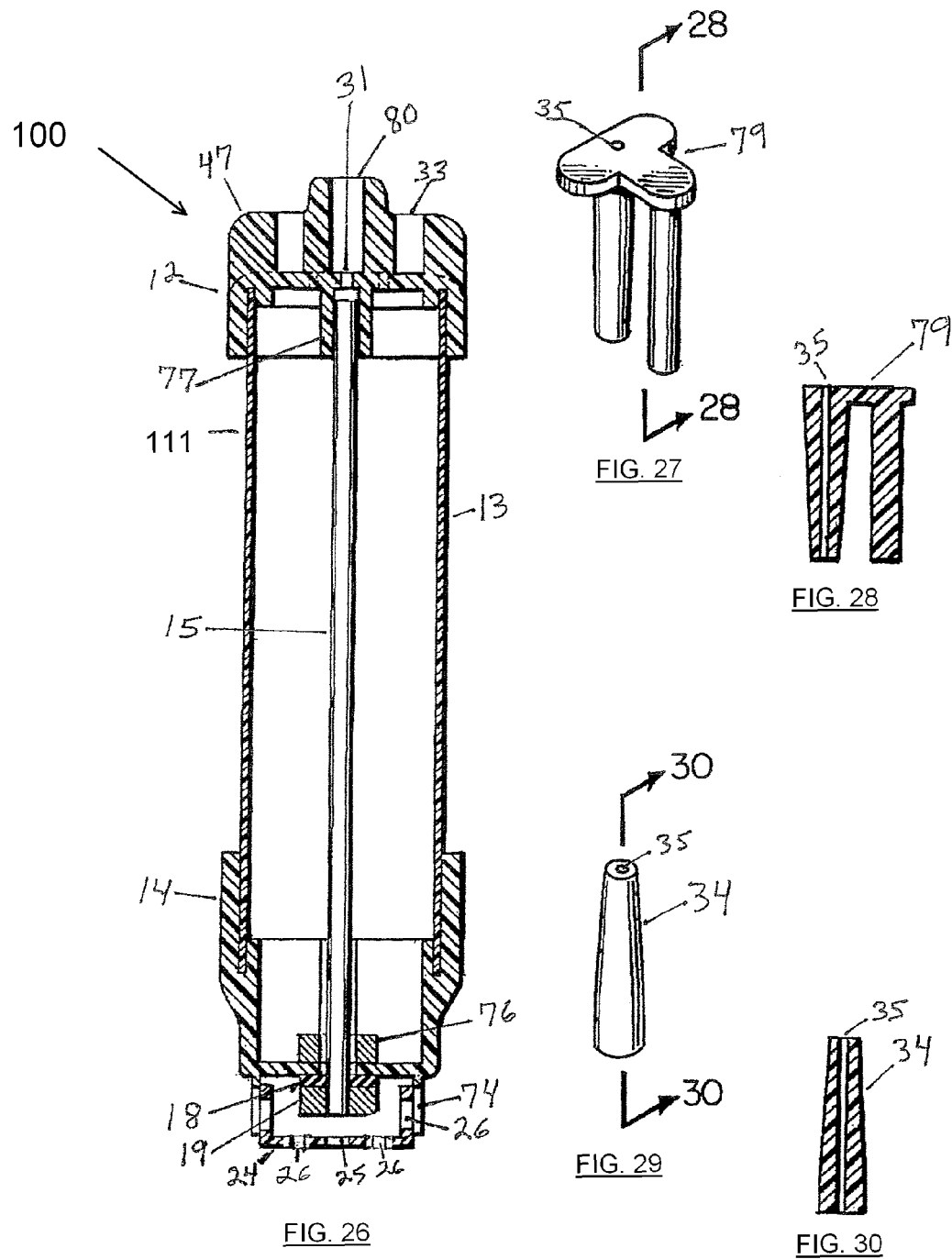
Figure 31:
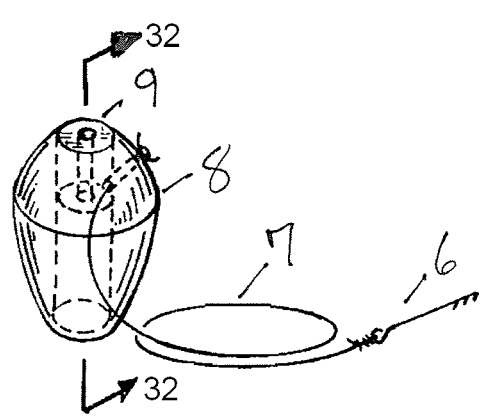
Figure 32:
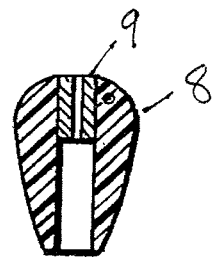
Figure 34:
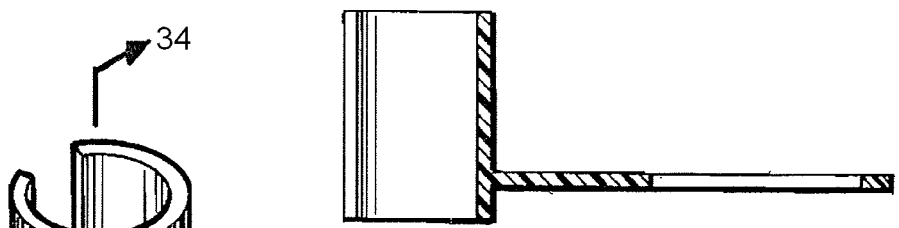
Figure 33:
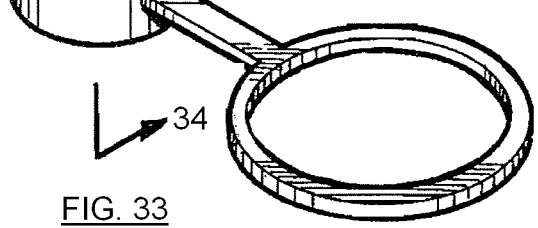
Figure 35:
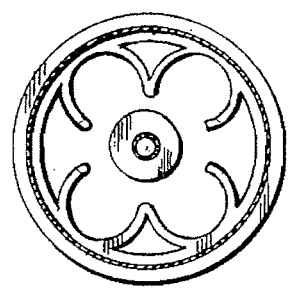
Figures 36, 37:
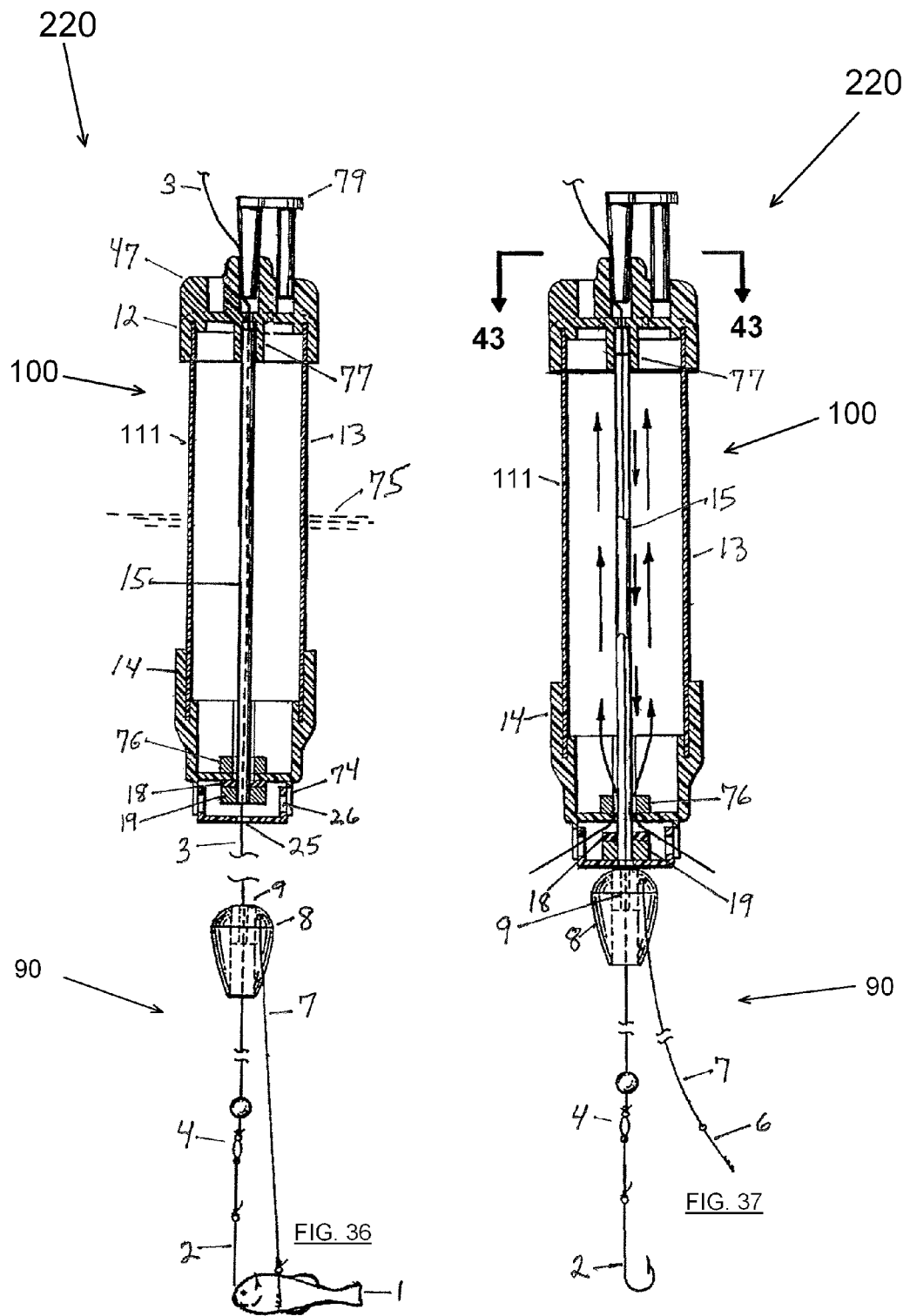
Figure 44:
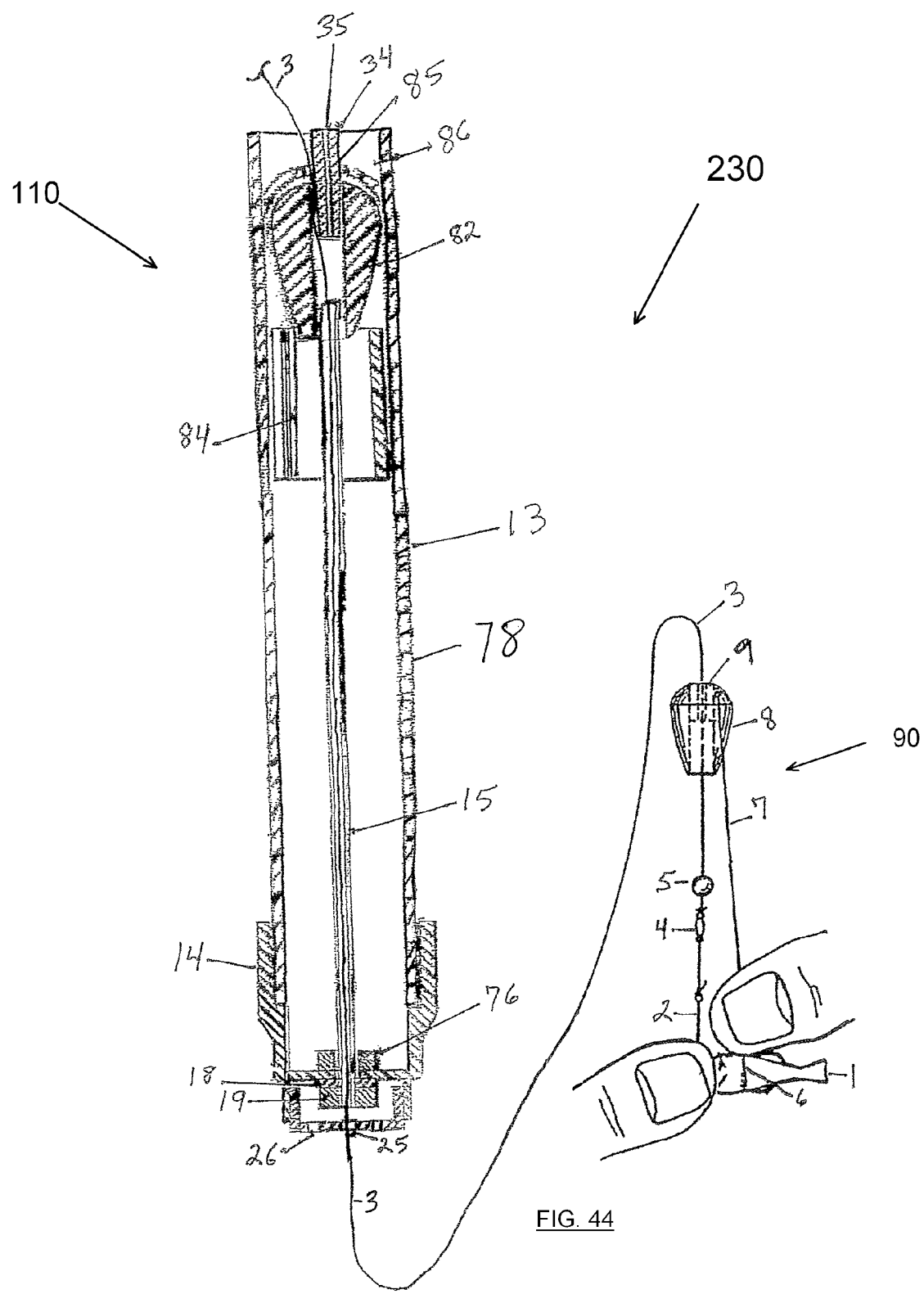
Figure 45:
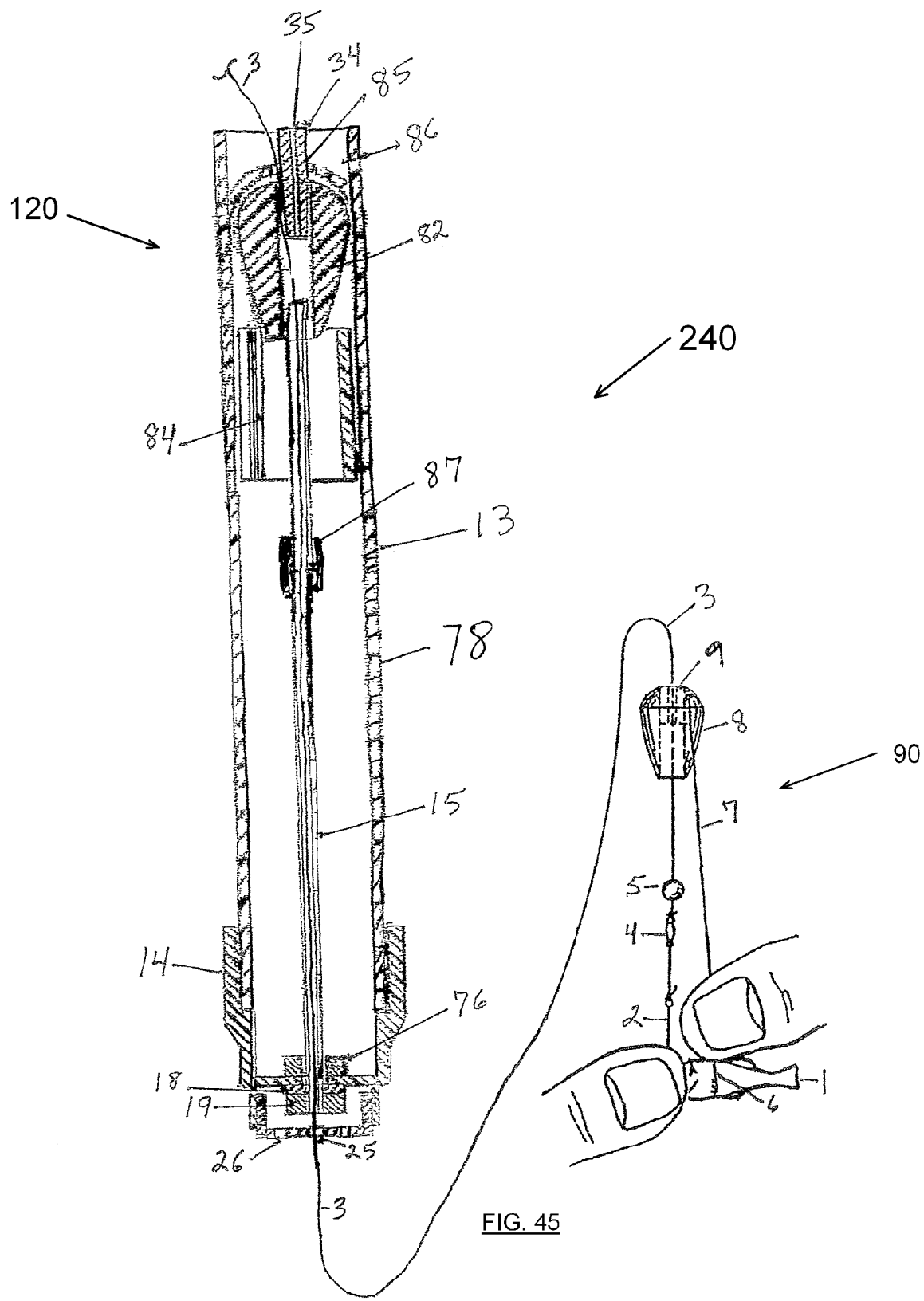

FIG. 25 is partial perspective view of an embodiment of the apparatus of the present invention;

FIG. 26 is a partial sectional elevation view of an embodiment of the apparatus of the present invention;

FIG. 27 is a partial perspective view of an embodiment of the apparatus of the present invention;

FIG. 28 is a partial sectional elevation view of an embodiment of the apparatus of the present invention;

FIG. 29 is a partial perspective view of an embodiment of the apparatus of the present invention;

FIG. 30 is a partial sectional elevation view of an embodiment of the apparatus of the present invention;

FIG. 31 is a partial perspective view of an embodiment of the apparatus of the present invention;

FIG. 32 is a partial sectional view of an embodiment of the apparatus of the present invention;

FIG. 33 is a partial perspective view of an embodiment of the apparatus of the present invention;

FIG. 34 is a partial sectional elevation view of an embodiment of the apparatus of the present invention;

FIG. 35 is a partial top view of an embodiment of the apparatus of the present invention;

FIG. 36 is a sectional elevation view of an embodiment of the apparatus of the present invention;

FIG. 37 is a sectional elevation view of an embodiment of the apparatus of the present invention;

FIG. 38 is a sectional elevation view of an embodiment of the apparatus of the present invention;

FIG. 39 is a sectional elevation view of an embodiment of the apparatus of the present invention;

FIG. 40 is a partial sectional elevation view of an embodiment of the apparatus of the present invention;

FIG. 41 is a sectional elevation view of an embodiment of the apparatus of the present invention;

FIG. 42 is a partial sectional view of an embodiment of the apparatus of the present invention;

FIG. 43 is a partial cut-away top view of an embodiment of the apparatus of the present invention;

FIG. 44 is a sectional elevation view of an embodiment of the apparatus of the present invention; and FIG. 45 is a sectional elevation view of an embodiment of the apparatus of the present invention.

DETAILED DESCRIPTION OF THE INVENTION

Figure 1:
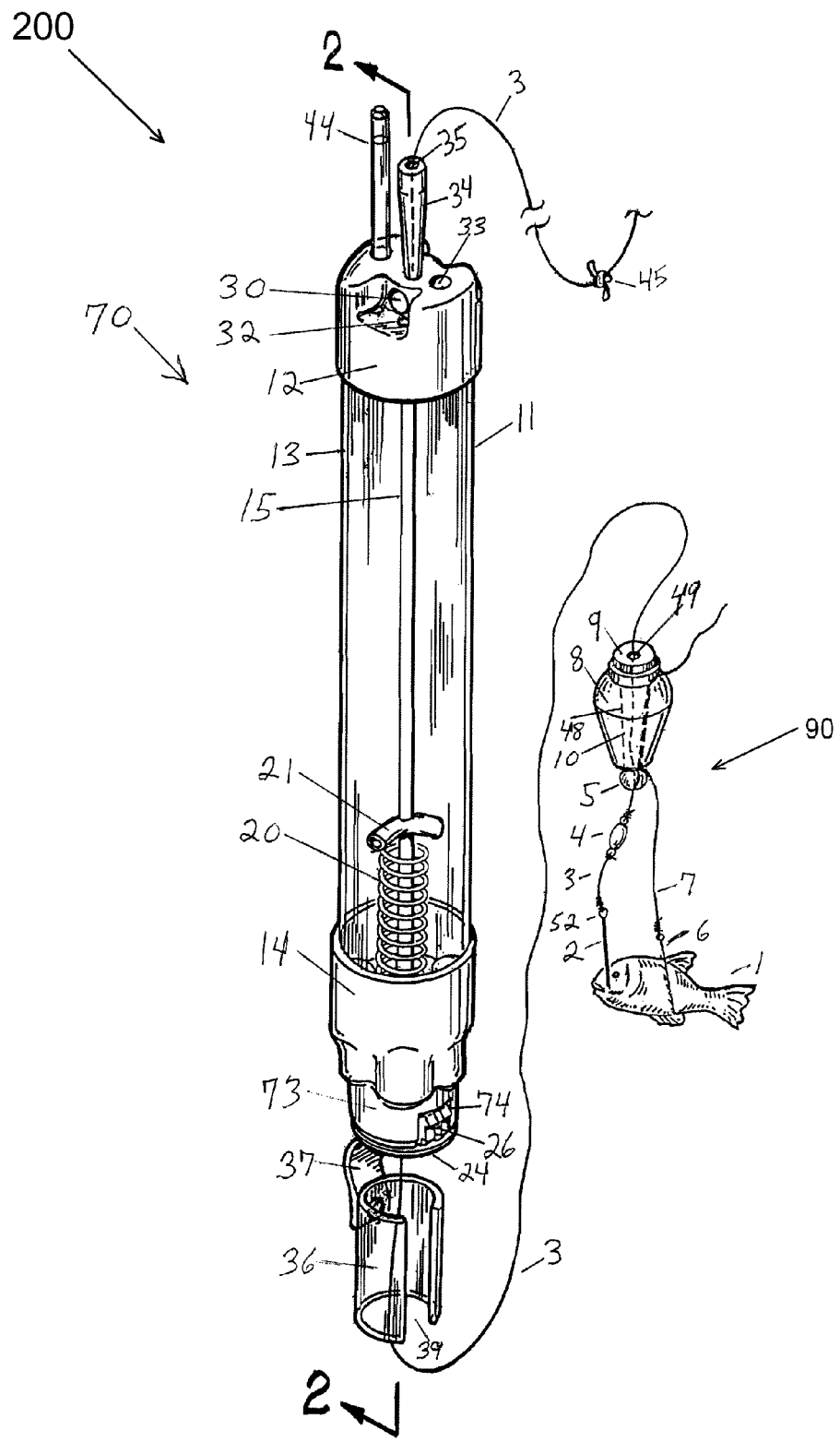
FIG. 1 is a perspective view of an embodiment of the apparatus of the present invention.

The figures show preferred embodiments of the fishing apparatus of the present invention. The fishing apparatus of the present invention is preferably used by an angler using a bait article 1 while fishing. In FIG. 1 the bait article 1 can be for example a live bait article, such as a minnow as is shown. However the bait article 1 can be any known article of live, fresh, frozen, or preserved bait and/or any bait article that is synthetic or artificial, such as those shown at the website www.basspro.com.

In FIG. 1 the bait article 1 is attached to a hook 2. Small pieces of tubing or other similarly affixable material, known as slide stoppers 42, FIG. 20, may be affixed to the hook 2 above and below the bait article 1 to keep the bait article 1 properly positioned on the hook 2. The hook 2 shown is a general representation and may be replaced with any known fishing hook, such as a treble hook, circle hook, jig head hook, or weighted fishing hook. Fishing line 3 is affixed to the hook eye 52 on its distal end, FIG. 1. If the fishing line 3 is segmented, the segments may be of the same or differing types and dimensions and will preferably be connected in line, end to end, by any known means such as a knots, clips, rings, or swivels (line connector 4) to form one continuous fishing line 3, FIG. 1. An optional sinker 5 may be used. An impaling and holding device, known as the bait anchor 6, securely holds the bait article 1 to a line, known as the tether line 7, FIG. 1. The bait anchor 6 preferably has a pointed distal end and a means to deter separation of the coupled objects such as the use of a barb or barbettes located along the sides of the device, and an eye on its proximal end for attachment of a line. One end of the tether line 7 is preferably secured to the bait anchor 6, while the other end of the tether line 7 is preferably secured to a float known as the trigger float 8, FIG. 1. The trigger float 8 preferably can only move along the length of the fishing line 3. The trigger float 8 preferably has an annular magnet known as the trigger magnet 9 affixed to its upper surface, FIG. 1. The fishing line 3 preferably passes unfettered through a centrally located through-hole known as the trigger magnet line hole 49, of annular trigger magnet 9 and the trigger float line hole 48, FIG. 1. The trigger float 8 and trigger magnet 9 may be joined together by a connecting tube 10 FIG. 4 which runs through their central line holes, fitting tightly to their inner diameter walls, or by a suitable adhesive or other fastener such as a fenestrated retention band encircling both the trigger float 8 and trigger magnet 9. The connecting tube 10, FIG. 4 can also secure the tether line 7 to the trigger float 8 by pinning the tether line 7 to the walls of the trigger float line hole 48. The tether line 7 may exit the trigger float 8 from the bottom, or if there is a worry about tangling the tether line 7 with the fishing line 3, the tether line 7 could exit from the top of the trigger float 8 which would cause greater separation between the two lines, FIGS. 18, 19, and 20. The bait assembly 90 is preferably made up of fishing line 3, trigger magnet 9, trigger float 8, line connector 4, sinker 5, tether line 7, bait anchor 6, hook eye 52, and hook 2, but may be modified as known to one skilled in the art.

In this example of trigger float 8, FIG. 4 the fishing line 3 passes unfettered though the connecting tube 10, which is holding the trigger magnet 9 and trigger float together. The trigger float 8 is preferably located above any fishing line tackle such as the line connector 4 (swivel), or sinker 5, or they preferably are small enough to not impede the movement of trigger float 8 along the fishing line 3.

An optional hook line guide 41, FIG. 21, in this example a loop affixed to the hook 2 which is used to redirect the buoyancy pull of the trigger float 8 when it is greater than the drag of the bait article 1 and the hook 2. In this situation, the lower end of the hook 2 and bait article 1 would want to rise up, resulting in an undesirable orientation if the hook line guide 41 were not present to prevent its occurrence. The inner diameter of the hook line guide 46 preferably is large enough to allow easy passage of the bait anchor 6.

The fishing line 3 preferably connects the hook 2 to a fishing pole/fishing rod-reel 43, FIG. 5, or any other object the angler deems suitable such as a tree limb, piling, rock, appendage, etc.

Some distance above the trigger float 8 along the fishing line 3 there can be another float known as the signal float 11, FIGS. 1 and 2. The body of the signal float 11 preferably consists of three sections which are joined together in a waterproof and air-tight manner. The three sections are the top cap 12, the tube body 13, and the bottom cap 14. The top cap 12 closes one end of the tube body 13, while the bottom cap 14 closes the other end of tube body 13. The joining of the three sections may be aided by using fastening aids such as adhesives, screws, or elastic bands. It is preferable to have the ability to disconnect at least the bottom section when needed, to service the interior parts of the signal float 11.

The external inferior surface of the bottom cap 14, FIG. 2, preferably has a central through-hole known as the water vent 17 which opens into the interior space of signal float 11. A distance outward from the water vent 17, vertical slotted walls, known as the magnet chamber walls 73, encircle the water vent 17, FIG. 3. The slots in magnet chamber walls 73 are known as chamber vents 74, FIG. 3. The space encompassed by the magnet chamber walls 73 is known as the magnet chamber 23, FIG. 8. The bottom of the magnet chamber 23 is enclosed by a cap known as the end cap 24, FIG. 3, whose vertical slotted walls fit tightly against the magnet chamber walls 73 with their respective slots oriented facing each other, FIG. 8. The slots in the walls of the end cap 24 are known as the cap vents 26, FIG. 3. The chamber vents 74 and the cap vents 26 are preferably oriented parallel with each other, forming one continuous vent from outside to inside the magnet chamber 23, FIG. 8. The end cap 24 bottom surface preferably has a through-hole, known as the end cap line hole 25, FIG. 8, preferably centrally located, which communicates with the space of the magnet chamber 23. The fishing line 3 passes freely through the end cap line hole 25, FIG. 8.

The interior surface of the bottom cap 14, FIG. 3, preferably has projections extending from the sides and bottom surfaces toward the water vent 17, which form sockets known as ballast sockets 27. These ballast sockets 27 can securely hold sinkers known as ballast sinkers 28 or noisemakers 29. The walls of the ballast sockets 27 preferably do not extend all the way to the water vent 17.

The upper surface of the top cap 12, FIG. 1, preferably has a raised area known as the plateau 47, in its center which extends outward a distance. The center of the upper surface of the top cap 12 preferably has a vertical through-hole known as the top cap line hole 31, from the upper surface of the plateau 47 to the interior of the signal float 11, FIG. 2. The fishing line 3 preferably passes freely through the top cap line hole 31. There is preferably at least one vertical socket known as the light socket 33, extending from the upper surface of the plateau 47 downward, but is preferably not deep enough to penetrate the inferior surface of the top cap 12. The light socket 33 preferably provides an anchor point for a chemical light stick 44, FIG. 1, for use in low light conditions, or any other item an angler may decide to attach to the signal float 11. There is preferably a through-hole, known as the anchor hole 30, FIG. 1, which preferably extends from one of the sides of the plateau 47 through to the opposite side of the plateau 47. The anchor hole 30 preferably intersects and passes through the top cap line hole 31 and its diameter is preferably equal to or greater than the diameter of the top cap line hole 31. There is preferably at least one other hole, known as the auxiliary air vent 32, FIG. 1, extending from a side of the plateau, preferably below the level of the anchor hole 30, which penetrates one side of the top cap line hole 31 FIG. 1. The location of the auxiliary air vent 32 is not limited to the area described, as long as it allows communication between the exterior atmosphere and the interior of signal float 11 when needed and is capable of being closed when needed. The auxiliary air vent 32 could also be a through hole located on the peg 34 perpendicular to, and intersecting, the peg line hole 35. If located on the peg 34, the auxiliary vent hole would preferably be in line with the top cap line hole 31 when peg 34 is inserted properly into the anchor hole 30.

The interior horizontal surface of the top cap 12, FIG. 2, preferably has the top cap line hole 31 running through its center. A clear space extends around the top cap line hole 31 for a distance until it abuts the encircling vertical slotted walls known as the piston seal guide 46.

Inside the magnet chamber 23 is an annular magnet, known as the water vent magnet 19, FIG. 2. The water vent magnet 19 preferably can move freely up and down the inner space of the magnet chamber 23. The water vent magnet 19 is preferably situated horizontally so that its interior space is in line with all the line holes of the various parts of the signal float 11.

There is a tube, known as the piston tube 15, FIG. 2, inside the signal float 11. The exterior wall of the bottom end of the piston tube 15 preferably fits tightly against the inner diameter wall of the annular water vent magnet 19, inside the magnet chamber 23. The piston tube 15 preferably extends through the water vent 17, through the interior of the signal float 11. The upper end of the piston tube 15 preferably ends immediately against or in very close proximity to, the inferior surface of the top cap 12, in line with the top cap line hole 31, FIG. 2. There is an annular seal, known as the upper piston seal 16 FIG. 2, the inner wall of which preferably tightly fits around the exterior wall of the upper end of the piston tube 15. The top surface of the annular upper piston seal 16 presses tightly against the inferior surface of the top cap 12, and completely seals the surface around the periphery of the top cap line hole 31.

Between the upper surface of the water vent magnet 19 and the water vent 17 and the inferior surface of bottom cap 14 surrounding the water vent 17 is preferably an annular seal, known as the water vent seal 18, FIG. 2. The inner wall of the annular water vent seal 18 fits tightly around the exterior wall of the piston tube 15. The upper surface of the water vent seal 18 presses against the inferior surface of the bottom cap 14, sealing the water vent 17. The bottom of the water vent seal 18 presses against the top surface of water vent magnet 19. There is preferably still space between the bottom surface of the water vent magnet 19 and underlying surface of the end cap 24, FIG. 2.

A coil spring known as the piston spring 20, FIG. 2, is preferably situated around the piston tube 15, the base of the piston spring 20 preferably rests on the interior bottom surface of the bottom cap 14 in the open area between the ballast sockets 27 and the water vent 17. The inner surfaces of the piston spring 20 preferably do not contact the piston tube 15. An optional base plate 22, FIG. 2, is disc-shaped, with a central through-hole large enough to allow unfettered vertical movement of the piston tube 15, which passes through it, and with fenestrations 40, FIG. 3, across its surface from top to bottom to allow water and air flow. The base plate 22 may be placed above any ballast sinkers 28, noisemakers 29, and the top surface of the ballast sockets 27. The base plate 22 is preferably used when the outer diameter of the piston spring 20 is greater than the diameter of the open space between the ballast sockets 27 and the water vent 17 or the presence of any sinkers 28 or noisemakers 29 would interfere with the placement or movement of the piston spring 20, FIG. 2. The base of the piston spring 20 will preferably rest on the upper surface of the optional base plate 22. The outer diameter of the base plate 22 will preferably fit inside the interior diameter of the tube body 13, FIG. 2.

In FIG. 2 an adjustable spring tensioner 21 preferably presses downward on the upper end of the piston spring 20, partially compressing the piston spring 20 and securely gripping the external wall of the piston tube 15 at a level where the stored energy of the partially compressed piston spring 20 keeps the areas covered by the water vent seal 18 and the upper piston seal 16 leak proof. At this point the signal float 11 is fully buoyant and has a leak proof interior, FIGS. 2, 6, and 8.

A fishing line 3 is able to be freely passed in a straight line through the top cap line hole 31, the annular upper piston seal 16, the inner diameter space of the piston tube 15, the annular water magnet 19, the magnet chamber 23, and the end cap line hole 25, FIG. 2.

There are two ways the signal float 11 can preferably be rigged:
a) as a popping rigged signal float, FIGS. 10 and 11, referred to as the signal float-popping 69
b) as a sliding rigged signal float, referred to the as signal float-sliding 70

In each case, the entire configuration composed of the signal float-popping or signal float-sliding and the bait assembly 90 constitutes bait fishing assembly 200. In FIG. 10, the signal float-popping 69 rig is preferably used to present the bait article 1 at a desired fixed depth which is preferably usually shorter than the height of the angler. In the signal float-popping 69 rig, the fishing line 3 is passed through the signal float 11, and the magnetic trigger float 8, to end secured to the hook eye 52 as previously described. In FIGS. 10 and 11, the signal float 11 is preferably affixed to the fishing line 3 by pushing a conical peg 34 into the anchor hole 30 until the fishing line 3 is tightly pressed between the wall of the anchor hole 30 and the exterior wall of the conical peg 34. The outer diameter of the narrow end of peg 34 is preferably smaller than the diameter of the anchor hole 30. The outer diameter of the larger end of peg 34 is preferably at least the same, or greater, diameter as the anchor hole 30. The length of peg 34 preferably is longer then the length of anchor hole 30. The conical peg 34 preferably also has a through-hole running along its long axis, known as the peg line hole 35. The point along fishing line 3 where peg 34 affixes the signal float 11 determines how deep the hook 2 impaled bait article 1 is suspended when the alarm system is deployed, FIG. 10.

Another advantage of a popping rig is that fish attracting noise and water turbulence are created when the deployed rig is popped, or pulled sharply back toward the angler for a moment. The signal float-popping 69 is pulled at least partially sideways and the top surface of the signal float-popping 69 is at least partially submerged while being pulled through the water, creating noise and turbulence. Greater noise and turbulence can be achieved if at least part of the top surface of the signal float-popping 69 possess a depression or other drag or noise creating feature.

The deployment of the BARE HOOK/LOST BAIT ALARM SIGNAL FLOAT-POPPING rig, FIG. 10 is as follows:
a) The desired depth of the hook 2 is set by pinning the fishing line 3 at its appropriate point to the signal float-popping 69 preferably via the anchor hole 30 by peg 34.
b) The bait article 1 is impaled onto the hook 2.
c) The trigger float 8 is separated from the bottom of the signal float-popping 69 and brought down toward the hook 2.
d) The bait anchor 6 is impaled into bait article 1.
e) The angler uses the fishing pole/rod-reel to cast the alarm system into the water.
f) The signal float-popping 69 remains visible on the water surface 75, similar to FIG. 6.
g) The bait article 1 and attached hook 2 and attached magnetic trigger float 8 sink to the desired depth, similar to FIG. 6.

When bait is removed from the hook 2 and the bait anchor 6, the untethered magnetic trigger float 8 ascends freely along the fishing line 3 toward the bottom of the signal float-popping 69 and the water surface 75, similar to FIG. 7.

As the magnetic trigger float 8 reaches the bottom of the signal float-popping 69, the magnetic attractive force between the trigger magnet 9 and the water vent magnet 19 becomes greater than the opposing force of the partially compressed piston spring 20, similar to FIG. 7.

This greater force causes the water vent magnet 19 and the attached piston tube 15 to move toward the end cap 24 carrying along with them the water vent seal 18 and the upper piston seal 16, and further compressing the piston spring 20 by the affixed spring tensioner 21, similar to FIG. 7.

The displacement of the water vent seal 18 and the upper piston seal 19 opens the interior of the signal float-popping 69 to the entrance of water through the water vent 17 and the exit of air mostly or totally through the auxiliary air vent 32 as the peg 34 mostly blocks the passage of air through the top cap line hole 31, similar to FIG. 7.

Thus, the water vent magnet 19 and water vent seal 18 act as an automatic valve when triggered by the trigger float 8. This automatic valve is thus magnetically operated, but it could be optically operated with modifications which would be apparent to one of ordinary skill in this art.

The loss of air from, and the filling with water into the signal float-popping 69 interior preferably causes the buoyancy of the signal float-popping 69 to decrease to the point where the signal float-popping 69 sinks beneath the water surface 75, similar to FIG. 7. The angler is now unable to see the signal float-popping 69, notifying the angler to check if the hook 2 is bare or if there is a fish attached.

The speed of the sinking of the signal float-popping 69, if observed by the angler, preferably will provide a clue, as a fish pulling on the hook 2 preferably will generally cause the signal float-popping 69 to sink at a faster rate.

The signal float-sliding 70 rig, FIGS. 1, 2, 4, 5, 6, 7, 8, 9, is usually used when the impaled bait article 1 is desired to be suspended at a water depth which is preferably greater than the depth that can be reached by a popping rig 69 (generally deeper than the height of the angler).

The BARE HOOK/LOST BAIT SIGNAL FLOAT-SLIDING rig, FIGS. 1, 2 is composed of the following parts:
a) the fishing line 3
b) the signal float 11 and its component parts
c) the magnetic trigger float 8
d) any optional tackle such as a line connector 4 (for example, a swivel) and sinker 5
e) the hook 2
f) the tether line 7
g) the bait anchor 6
h) the bait article 1

The angler end of the fishing line 3 is affixed to whatever device/object the angler deems suitable, such as a fishing pole, rod/reel, rock, etc. The parts are arranged, aligned, and connected to each other as previously described.

Additional parts and arrangements needed for the BARE HOOK/LOST BAIT ALARM SIGNAL FLOAT-SLIDING rig FIGS. 1, 2, 6, and 8 include:
i) the peg 34 which is situated above the signal float 11, with the fishing line 3 freely passing through the peg line hole 35 before passing through the top cap line hole 31, FIG. 2. The peg 34 is too large to fit into the top cap line hole 31.
ii) the depth setter 45, which is preferably an object affixed to a point on the fishing line 3 above peg 34 and is too large to fit into the peg line hole 35, FIG. 1. The fishing line 3 does not move freely through the depth setter 45. The depth setter 45 preferably is a very light weight flexible object such as a piece of rubber band or string which can be tightly knotted around or affixed in another way to the fishing line 3 and be wound onto a reel without difficulty. The length of fishing line 3 below its fixation point with the depth setter 45 determines the depth that will be reached by the hooked bait article 1. The depth setter 45 is preferably adjustable along the length of fishing line 3 above the peg 34.
iii) the tether ring 38, FIG. 3, which preferably fits tightly around the walls of the magnet chamber 23 and provides an attachment point for the spacer tether 37, FIG. 3. The tether ring 38 may be replaced by any other means of attachment between the signal float-sliding 70 and the spacer tether 37.
iv) the spacer tether 37, which is preferably a line or thin ribbon of flexible light weight material which is affixed to the tether ring 38 on one end and the casting spacer 36, FIG. 3, on the other end.
v) the casting spacer 36, FIG. 1, which is preferably a tubular object with a lengthwise section removed completely from end to end, forming a slot, known as the spacer line slot 39, FIG. 1. The casting spacer 36 is preferably composed of a buoyant material.

The casting spacer 36 is preferably affixed to the spacer tether 37 on its upper end directly across from the spacer line slot 39.

The signal float-sliding alarm system, FIG. 1 is preferably set and deployed in the following manner:

To be baited and cast, the signal float-sliding 70 preferably has to be kept separated from the magnetic trigger float 8. Before the bait article 1 is affixed to the hook 2, the peg 34, which has the fishing line 3 passing through it, is inserted into the anchor hole 30, FIG. 4, which causes the part of fishing line 3, exiting the narrow end of the peg line hole 35, to be folded and tightly squeezed and affixed between the wall of anchor hole 30 and the outer wall of peg 34, FIG. 4. The signal float-sliding 70 is now temporarily fixed to the fishing line 3. There is a length of fishing line 3 between the bottom of the signal float-sliding 70 and the magnetic trigger float 8 preferably sufficient to keep the magnetic attraction between them to a negligible amount, FIG. 4. The bait article 1 is now impaled onto the hook 2. The bait anchor 6 is now impaled into the bait article 1. The magnetic trigger float 8 is now tethered to the bait article 1 by the tether line 7, FIG. 4.

After being baited, the signal float-sliding rig must be readied to be cast, FIG. 5. This is preferably done by pushing the peg 34 back out of the anchor hole 30, enabling sliding to occur between the signal float-sliding 70 and the fishing line 3. Before any sliding occurs, the casting spacer 36 is placed lengthwise between the bottom of the signal float-sliding 70 and the top of the magnetic trigger float 8. The fishing line 3 reaches the interior space of the casting spacer 36 through the spacer line slot 39 where it is freely movable. The signal float-sliding 70 and the in-line casting spacer 36 are now moved along the fishing line 3 until the bottom of the casting spacer 36 presses against the top of the magnetic trigger float 8, due to the weight of the signal float-sliding 70 resting on top of the casting spacer 36, FIG. 5. The signal float-sliding alarm system is now ready to be cast into the water.

After being cast into the water, a series of events occur to fully deploy the BARE HOOK/LOST BAIT ALARM SIGNAL FLOAT-SLIDING rig, FIG. 6, which are as follows:
1) The buoyant signal float-sliding 70 stays visible on the water surface 75, FIG. 6.
2) The bait article 1, hook 2, any tackle such as the line connector 4 and sinker 5, magnetic trigger float 8, and fishing line 3 descend from the water surface 75, FIG. 6.
3) As the magnetic trigger float 8 descends, the buoyant casting spacer 36 is preferably freed, and being buoyant, moves away from under the end cap 24, away from the fishing line 3 by means of the spacer line slot 80, toward the water surface 75, FIG. 6.
4) There is no longer any obstruction between the end cap 24 and the magnetic trigger float 8, FIG. 6.
5) The descending fishing line 3 slides downward through the signal float-sliding 70 until the affixed depth setter 45 preferably meets peg 34 and pushes peg 34 against the top cap 12, FIG. 6. The descent of fishing line 3 now ceases, presenting the hooked bait article 1 at the desired depth, FIG. 6.

After the bait article 1 is removed from the hook 2 and the bait anchor 6, the magnetic trigger float 8 preferably floats upward along the fishing line 3 until contacting the bottom of the end cap 4, FIG. 7.

The loss of buoyancy and sinking below the water surface 75 of the signal float-sliding 70 now preferably occurs in the same way as previously described for the signal float-popping 69, alerting the angler, FIGS. 7, and 9.

Another embodiment of the BARE HOOK/LOST BAIT ALARM, replaces the signal float 11 with a lighted float known as the beacon float 53. The beacon float 53, FIGS. 12,13,14,15, and 16, consists of the following parts:
1) a one-end open tube 54, FIG. 13 which is preferably transparent or translucent
2) a transparent or translucent cap 55, FIG. 13 which preferably closes the one-end-open tube 54 in a leak proof fashion, forming a leak proof housing known as the electronics housing 59, FIG. 12.
3) a buoyant jacket, known as the flotation jacket 56, FIG. 12, preferably surrounds and tightly grips a circumferential section, or mostly circumferential section, of the exterior wall of the electronics housing 59 when the electronics housing 59 is inserted into the inner hollow space of the flotation jacket 56. The flotation jacket 56 can be shaped similar to a horizontal C or O, with an interruption in its wall, from its exterior surface to its interior surface, known as the jacket line slot 51, FIG. 13. A separate through-hole, known as the jacket line guide 50, FIG. 13 preferably extends from the upper surface to the lower surface of the flotation jacket 56.

4) Surrounding and tightly gripping a lower portion of the electronics housing 59 is a ring, known as the ring stop 60, FIG. 17. A through-hole from the upper surface to the bottom surface of ring stop 60, is known as the ring stop line guide 61, FIGS. 12 and 13. A flexible closed slit from the exterior sidewall of ring stop 60 into the interior of the ring stop line guide 61 may exist to allow the fishing line 3 to enter the ring stop line guide 61 from the side. At least a part of a magnetically attractive object known as the magnet captor 62, FIGS. 12, 13, 14, 15, 16, and 17 is located on the inferior surface of the ring stop 60 in close proximity to the ring stop line guide 61 and the exterior wall of the electronics housing 59. The magnet captor 62 may also extend above the ring stop 60.

The interior of the beacon float 53, FIGS. 12 and 13 contains the following:

5) a circuit board 65 preferably containing a battery 66, a magnetic reed switch 67 which is normally closed in the absence of a magnetic field, and preferably two light emitting devices, such as LED chips or lamps, with one directed above the water surface, visible to the angler, known as the angler beacon 63, FIGS. 13 and 16, and the other, known as the attractor beacon 64, FIGS. 13 and 16, whose emitted light is primarily visible below the water surface. The circuit board 65 also contains all the other parts and connected circuitry to enable proper functioning of all the parts, which would be known to those skilled in the art. (A schematic, FIG. 22, is included.)

6) a line, known as the retrieval line 68, FIGS. 12 and 13, which is affixed on one end to the circuit board, the other end and the rest is positioned to be acquired and pulled upon when the circuit board is required to be removed from the open beacon float electronics housing 59, such as when the battery needs to be replaced.

7) If desired, insulated ballast (sinkers), not shown, may be placed in the lower part of the electronics housing, or affixed to the exterior of the electronics housing 54 or the tether ring 60 or the float jacket 56, in a manner that does not greatly interfere with the attractor beacon 64.

The beacon float 53 can be rigged in two ways to form THE BARE HOOK/LOST BAIT ALARM BEACON FLOAT SYSTEM 1) as a popping float, known as the beacon float-popping rig 71, FIG. 16, and
2) as a sliding float, known as the beacon float-sliding 72 rig, FIGS. 12, 13, 14, and 15

In each configuration, the entire assembly composed of the bait assembly 90 plus the beacon float-popping 71 or beacon float-sliding 72 constitutes bait fishing assembly 210. To be rigged in the beacon float-popping 71 manner, FIG. 16, the fishing line 3 is passed through the jacket line slot 51 into the interior space of the flotation jacket 56. The electronics housing 59 is inserted into the interior space of the flotation jacket 56 until the fishing line 3 is tightly pressed and held immobile between the interior wall of the flotation jacket 56 and the exterior wall of the electronics housing 59. The length of fishing line 3 between this fixation point and the attached hook 2, determines the submerged depth of the hooked bait article 1.

Optional friction bands FIG. 17, which are stretchable and durable, can be placed around either the electronics housing 59, known as the housing friction band 57, or the flotation jacket, known as the jacket friction band 58, or both to increase the holding power between the electronics housing 59, the fishing line 3, and the jacket 56. The fishing line 3 then passes through the ring stop line guide 61, FIG. 16.

A distance below the ring stop 60, the fishing line 3 preferably passes through the magnetic trigger float 8, any line connector 4 (such as a swivel) and any optional sinker 5, till the end of fishing line 3 affixes to the hook 2, FIG. 16.

The bait article 1 is impaled onto the hook 2, FIG. 16.

The bait anchor 6 is impaled into the bait article 1, tethering the magnetic trigger float 8 to the bait article 1 preferably via the tether line 7, FIG. 16.

The distance between the trigger magnet 9 and the magnetic reed switch 67 is preferably great enough to keep the magnetic field of the trigger magnet 9 from influencing the magnetic reed switch 67. The electric circuit is normally closed allowing light to be emitted from the angler beacon 63 and attractor beacon 64, FIG. 16.

To be rigged in the beacon float-sliding 72 manner, FIGS. 12, 13, 14, and 15, a tether ring 38 is preferably added above the ring stop 60, tightly fitting to the exterior wall of the electronics housing 59. The ring stop 60 may also serve as a substitute tether ring 38, FIG. 12.

A flexible tether line or ribbon, known as the spacer tether 37, attaches to the tether ring 38 on one end and to a casting spacer 36, on the other end.

The fishing line 3 is preferably passed though the peg line hole 35 of the peg 34, FIG. 12. A depth setter 45 is affixed to the fishing line 3 preferably above the peg 34, between the fish-ing pole/rod-reel 43. and the peg 34, FIG. 12.

Then the fishing line 3 is preferably passed through the top surface of the flotation jacket 56 through the jacket line guide 50, and out from the bottom of the flotation jacket 56, FIG. 12.

The fishing line 3 next passes through the ring stop line guide 61, FIG. 12. The casting spacer 36 is placed under the bottom of the beacon float-sliding 72 and the fishing line 3 slides through the spacer line slot 39 to the interior space of the casting spacer 36 and out through the bottom end of the casting spacer 36.

The fishing line 3 then preferably continues down through the magnetic trigger float via the connecting tube 10. The fishing line 3 then exits the bottom of the magnetic trigger float 8, continuing through any optional sinkers 5 and any line connector 4. The fishing line 3 terminates by being affixed to the hook eye 52 of hook/jig-head hook 2.

The beacon float-sliding 72 rests on top of the casting spacer 36, FIG. 12. The bottom of the casting spacer 36 rests on top of the magnetic trigger float 8, similar to FIG. 5.

The bottom of trigger float 8, preferably rests on either an optional sinker 5, a line connector 4, or the hook eye 52, similar to FIG. 5, FIG. 12.

The bait article 1 is affixed to the hook 2, FIG. 12.

The bait anchor 6 is impaled into the bait article 1, anchoring the magnetic trigger float 8 to the bait article 1 via the tether line 7, FIG. 12.

The beacon float-sliding rigged BARE HOOK/LOST BAIT ALARM, is now ready to be cast into the water.

The casting sequences of the beacon float-popping rig and the beacon float-sliding rig mimic the casting sequences of the respective signal float-popping rig 69 and the signal float-sliding rig 70.

For both beacon float rigs, FIGS. 14, 15, and 16.

After the bait article 1, is removed from the hook 2, FIG. 15, and the bait anchor 6, the magnetic trigger float 8 is able to freely ascend along the fishing line 3 until the magnetic trigger float 8 reaches the ring stop 60. The trigger magnet 9 is attracted to and affixes to the magnet captor 62, which holds the trigger magnet 9 in close enough proximity to the magnetic reed switch 67, located in the waterproof electronics housing 59, to enable the magnetic field of the trigger magnet 9 to influence the magnetic reed switch 67. As a result the normally closed circuit becomes open, cutting off the electrical current to the angler beacon 63 and the attractor beacon 64, FIG. 15. The resulting loss of light emission notifies the angler to see if the hook 2 is bare, FIG. 15.

The circuitry and electronics could be modified so that only the angler beacon 63 is turned off and the attractor beacon 64 continues to emit light when the magnetic reed switch 67 changes from closed to open.

The color of the emitted light from the beacon float 53 above the water surface 75 preferably is one that is best seen by the human eye at night (for example, white) or that does not hamper human vision at night (for example, red or green).

The color of the light emitted from the beacon float 53 below the water surface preferably is one that is easily seen by the fish and is also non-threatening, such as green.

The beacon float 53 could also have only an angler beacon 63 which may also function, if only partially, as an attractor beacon 64.

A suitable lighted beacon float schematic is shown in FIG. 22. The detector switch S1 preferably consists of any electromechanical device that detects the bait article 1 has been released. The detector switch S1 is a normally closed magnetic reed switch. The switch S1 allows current to flow from the battery B1, to the circuit. When bait article 1 is released, a cascade of events occur, which results in the switch S1 opening and thereby interrupting the current flow.

Integrated circuit U1 and inductor L1 comprise a boost converter. The boost converter boosts the nominal 1.5V battery voltage to a voltage that is appropriate to forward bias the two parallel connected LEDs, LED1 and LED2, determined by the forward on voltage of the LEDs. This particular boost converter regulates the boost current. The output voltage is determined by the forward on voltage of the LEDs. The boost converter provides the boost current by switching the current through L1 at a high frequency rate. In this particular implementation, the switching frequency is preferably approximately 500 kHz. The value of L1 preferably determines the forward bias current to the LEDs.

Capacitor C2 enhances the circuit performance by lowering the high frequency impedance of the battery. C2 is not essential to the function of this circuit. C2 has the effect of extending battery life by lowering the battery impedance on a pulse by pulse basis.

Diode D1 (e.g. a parallel connected Schottky-type) with the filter capacitor C1 further enhance the circuit performance by minimizing the peak pulse current to the LEDs. The output from the boost converter circuit is preferably a series of pulses. These pulses may exceed the peak current of certain LEDs that may be used. The D1 and C1 filter circuit converts these pulses to an average current level of a lower level. D1 and C1 are not essential components for the function of this circuit. The use of these components depends on the specific boost convert type and LEDs selected.

LED1 and LED2 are preferably light emitting diodes. This circuit shows the LEDs in parallel however, depending on the type of LEDs selected, the LEDs may be connected in series.

A transmitter can be used to signal the angler preferably with an alarm (e.g., sound, vibration, etc.). A transmitter such as shown in FIG. 23 could be employed. This can be used by itself or with, for example, the LEDs of FIG. 22. The detector consists of any electromechanical device that detects the bait article 1 has been released. The detector can be a magnetic reed switch. The output of the detector is a signal that starts the timer in the encoder circuit.

The duty cycle senses the output from the detector. The duty cycle timer provides an enabling signal out to the encoder. The duty cycle determines the length of time between transmit bursts. The duty cycle limit is a regulatory requirement for low power, unlicensed transmitters.

The encoder is enabled by the output signal from the duty cycle timer. The encoder is preferably a user programmable serial shifter register pulse generator that allows the user to select one of N identity codes. N can be any number without limit but typically will be between 2 6 and 2 10. The output of the encoder is a series of pulse, N bit long. The RF transmitter can be any RF signal source with modulator. In the simplest case the transmitter may be only a single transistor oscillator modulated directly by the encoder to provide on-off keying (OOK).

The output of the transmitter is connected to an antenna. In the system of the present invention, the antenna can be a simple wire monopole; however any antenna may be used provided the overall transmitter complies with the regulations for unlicensed transmitters.

The receiver is shown in the diagram of FIG. 24. The RF receiver can be any receiver circuit that is compatible with the transmitter. The receiver can be a simple AM receiver that detects the OOK and provides a pulse output.

The decoder is preferably a serial shift register and comparator that is user programmable with one-of-N identity codes. N can be any number without limit but typically will be between 2 6 and 2 10. The user selects an identity code that matches the code in the transmitter. If the decoder detects a match, an output signal pulse occurs.

The timer preferably conditions the decoder output by extending the pulse length to provide a suitable signal to the enunciator. The timer is also used to set the length of time the receiver circuits are one. The timer duty cycle is set so as to conserve battery power in the portable implementation.

The enunciator can be any signal device such as a tone alert, vibration, or flashing light.

The simplest embodiment of the invention, FIGS. 18 and 19, uses anon magnetic trigger float 8 to signal the angler. This embodiment is used when the angler wishes to flat line rig, meaning there is no float normally on the water surface 75, FIG. 18. When the bait article 1 is removed from the hook 2 and the bait anchor 6, the non-magnetic trigger float 8 is freed and travels upward along the fishing line 3 to the water surface 75, FIG. 19. The trigger float 8 is now visible to the angler, FIG. 19, alerting the angler to the need to rebait the hook 2.

In another embodiment of the invention, FIGS. 25, 26, 27, 31, 32, 36, 37, 38, 39, 40, 41, 42 and 43, some previously described parts are modified, removed, relocated and some parts are added. FIGS. 25, 26, 36, 37, 38, 39, and 41 all display a sinking float 100. The complete configuration which utilizes sinking float 100 plus bait assembly 90 is referred to as bait fishing assembly 220 and can be seen in FIGS. 36-39 and 41. FIG. 44 displays a simplified sinking float 110 and FIG. 45 displays a simplified sinking float 120. The entire assembly incorporating simplified sinking float 110 plus bait assembly 90 constitutes bait fishing assembly 230. The entire assembly incorporating simplified sinking float 120 plus bait assembly 90 constitutes bait fishing assembly 240. Parts that are removed are the upper piston seal 16, the piston spring 20, the spring tensioner 21, and the base plate 22. The piston seal guide 46, is modified by shrinking its inner diameter until it is slightly greater than the outer diameter of the piston tube 15, leaving intact the unrestricted vertical movement of the piston tube 15. The piston seal guide 46, becomes the piston guide 77, FIG. 39, and keeps the piston tube 15, oriented vertically in line with the top cap line hole 25, The piston spring 20 and the spring tensioner 21 are removed. In their place is an annular magnet known as the tube body magnet 76, FIGS. 36, 39, and 42, which is located on the interior bottom surface of the bottom cap 14. The piston tube 15 passes freely through the interior space of the tube body magnet 76.

The polarity of the tube body magnet 76 is oriented to attract the water vent magnet 19 and press the water vent seal 18 around the water vent 17, sealing the water vent 17 to prevent the flooding of water into the signal float 100, FIGS. 26, 36, 41, and 42. When the trigger float magnet 9 is in close proximity to the exterior bottom surface of the end cap 24, the magnetic attraction between the trigger float magnet 9 and the water vent magnet 19 is great enough to pull the water vent magnet 19 away from the tube body magnet 76 towards the interior bottom surface of the end cap 24, FIG. 37. This downward displacement also moves the piston tube 15 and the water vent seal 18 downward, allowing water to pass through the water vent 17 into the interior of the signal float 11, FIG. 37.

Either the water vent magnet 19 or one of the other magnets the tube body magnet 76 or the trigger float magnet 9, may be replaced by less expensive ferrous, magnetically attracted material in annular shape as long as the same balance of attractions and movements are retained.

The anchor hole 30 is relocated to the central top of the plateau 47 surrounding the top cap line hole 31 and is renamed the anchor socket 80, FIG. 25. The sides of the plateau 47 are now not fenestrated.

A double peg 79, FIGS. 27, 28 and, 36, replaces the single peg 34, FIGS. 29 and 30, when rigging the signal float 11 in the popping configuration 69, FIGS. 36, 37, and 40. The double peg 79 is shaped like two single pegs 34 parallel to each other and connected by a bridge between the wide end of each peg; one of the legs of the double peg 79, fits into the anchor socket 80 and pinches the fishing line against the walls of the double peg 79 leg and the anchor socket 80, FIG. 40, which sets the depth of the hook 2. The other leg of the double peg 79 fits into one of the light sockets 33, FIG. 40 and provides extra holding power to prevent unwanted displacement of the double peg 79.

The auxiliary vent hole 32 is relocated to the flat surface to the side and below the plateau 47 and enters the interior of the signal float 11, FIG. 43. There may be one or more auxiliary vent holes 32, FIG. 43.

The chamber vents 74 in the magnet chamber walls 73 may be replaced by solid walls. The cap vents 26 may be relocated to the bottom of the end cap 24 and positioned peripherally around the end cap line hole 25, FIG. 26. There may be one or more cap vents 26.

In another embodiment, FIG. 44, the invention is further simplified by merging the top cap 12 and the tube body 13 into a single piece known as the float body 81.

Either one or both of the light sockets 33 may be eliminated. The double peg 79 may be eliminated, reverting back to using the single peg 34 in the popping configuration, FIG. 44.

The ballast sockets 27 may be eliminated, FIG. 44. Ballast sinkers 28 may be small enough to not interfere with the piston tube 15's vertical movement and may serve double duty as noisemakers since they are now free to bounce around the interior of the signal float.

A small float, similar to the trigger float 8 is added to the interior top of the float body 81. This float material forms a friction fit with the peg 34 in the popping float configuration of the sinking float, FIG. 44, and is known as the peg anchor 82. The peg anchor 82 also serves to replace the piston guide 77, as the piston tube 15 can use the central hole 83 of the peg anchor 82 as a guide, FIG. 44.

The peg anchor 82 may be held securely in place against the downward force experienced when the peg 34 is pushed into the peg anchor 82 by a locking collar 84, FIG. 44. The locking collar 84 is a tubular segment of semi-rigid material which may have a lengthwise longitudinal gap in one segment of its wall. The locking collar 84 fits tightly against the peg anchor 82 and the interior walls of the float tube body 81, FIG. 44. The longitudinal slit allows the locking collar 84 to change its inner and outer dimensions so as to be able to be used in different inner diameter float bodies 81. The anchor socket 80 totally absorbs the top cap line hole 31 and may be shorter becoming more of an anchor/line hole 85 than a socket, FIG. 44.

An auxiliary vent hole 32, one or more, may be located peripheral to the anchor/line hole 85, which will communicate with the interior of the float tube body 78. Longitudinal vent tunnels may also be located on the peg anchor 82 to allow communication with the main interior of the float tube body. The peg line hole 35 may also allow for the transit of air between the atmosphere and the interior of the float tube body in the popping float configuration, FIG. 44.

There may be an upper extension of the outer walls of the float body 81 past the top surface. This extension will turn the upper surface of the float body 81 into a cup-like depression known as the popping chamber 86, FIG. 44. The walls of the popping chamber 86 may be slotted or fenestrated to allow water to easily escape after the popping maneuver.

This simplified sinking signal float embodiment 110, FIG. 44, shown in the popping configuration, may also be rigged as a sinking signal float in a sliding configuration (not shown). In the sliding configuration, the rigging would be similar to FIGS. 38, 39, and 41, including the depth setter 45 and casting spacer 36.

FIG. 45 shows a simplified sinking signal float 120, similar to that shown in FIG. 44, but it additionally includes a piston tube coupler 87.

In all the sinking float embodiments, if there were to be differing sizes, small, medium and large, etc., there could be interchangeable parts for each size. For example, parts from the small size float such as the bottom cap 14, end cap 24, tube body magnet 76, water vent seal 18, water vent magnet 19, piston tube 15, trigger magnet 9, trigger float 8, tether line 7, bait anchor 6, casting spacer 36, peg 34, double peg 79 could be used in the other corresponding sizes. For the shorter piston tube 15, one would add a piston tube coupler 87, and another proper length of piston tube to increase length. One could also add a piston tube coupler 87 to the surface float shown in FIGS. 1-11 and 25-44 so that the float sizes can be interchangeable from small to medium to large as well. Also, the lengths of the exterior tube of the float can be changed in the same manner (by adding a coupler and another section). Also, one could use a corrugated accordion-style piston tube and/or a corrugated accordion-style exterior tube to alter length.

The float shown in FIGS. 18 and 19 (and the trigger floats 8 in other figures) is preferably sized such that its buoyancy is overcome by the impaled bait, the hook, or their combination.

All signal float embodiments may have spaces suitable for logos, advertisements, names, photos, and other printed materials and decals of suitable materials for a marine and outdoor environment. For example, but not limited to, a photo of a newborn baby's face could be incorporated into a pirate costume decal with suitable congratulation phraseology and be applied to the signal float and handed out to people instead of the traditional cigars.

PARTS LIST:

| Part Number | Description |
|---|---|
| 1. | bait article |
| 2. | hook |
| 3. | fishing line |
| 4. | line connector |
| 5. | sinker |
| 6. | bait anchor (may be barbed) |
| 7. | tether line |
| 8. | trigger (first) float |
| 9. | trigger magnet |
| 10. | connecting tube |
| 11. | signal (second) float |
| 12. | top cap |
| 13. | tube body |
| 14. | bottom cap |
| 15. | piston tube |
| 16. | upper piston seal |
| 17. | water vent |
| 18. | water vent seal |
| 19. | water vent magnet |
| 20. | piston spring |
| 21. | spring tensioner |
| 22. | base plate |
| 23. | magnet chamber |
| 24. | end cap |
| 25. | end cap line hole |
| 26. | cap vents |
| 27. | ballast sockets |
| 28. | ballast sinkers |
| 29. | noisemakers |
| 30. | anchor hole |
| 31. | top cap line hole |
| 32. | auxiliary vent hole |
| 33. | light socket |
| 34. | peg |
| 35. | peg line hole |
| 36. | casting spacer |
| 37. | spacer tether |
| 38. | spacer tether ring |
| 39. | spacer line slot |
| 40. | fenestrations |
| 41. | hook line guide |
| 42. | slide stoppers |
| 43. | fishing pole/rod-reel |
| 44. | light stick |
| 45. | depth setter |
| 46. | piston seal guide |
| 47. | plateau |
| 48. | trigger float line hole |
| 49. | trigger magnet line hole |
| 50. | jacket line guide |
| 51. | jacket line slot |
| 52. | hook eye |
| 53. | beacon float |
| 54. | one-end-open tube |
| 55. | cap |
| 56. | flotation jacket |
| 57. | housing friction band |
| 58. | jacket friction band |
| 59. | electronics housing |
| 60. | ring stop |
| 61. | ring stop line guide |
| 62. | magnet captor |
| 63. | angler beacon |
| 64. | attractor beacon |
| 65. | circuit board |
| 66. | battery |
| 67. | magnetic reed switch - normally closed |
| 68. | retrieval line |
| 69. | signal float - popping |
| 70. | signal float - sliding |
| 71. | beacon float -popping |
| 72. | beacon float - sliding |
| 73. | magnet chamber walls |
| 74. | chamber vents |
| 75. | water surface |
| 76. | tube body magnet |
| 77. | piston guide |

-continued

PARTS LIST:

| Part Number | Description |
|---|---|
| 78. | tube body |
| 79. | double peg |
| 80. | anchor socket |
| 81. | float body |
| 82. | peg anchor |
| 83. | central hole |
| 84. | locking collar |
| 85. | anchor/line hole |
| 86. | popping chamber |
| 90. | bait assembly |
| 100. | sinking float |
| 110. | simplified sinking float |
| 111. | signal float |
| 120. | simplified sinking float |
| 200. | bait fishing assembly |
| 210. | bait fishing assembly |
| 220. | bait fishing assembly |
| 230. | bait fishing assembly |
| 240. | bait fishing assembly |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A bait fishing assembly for fishing with a fishing line, comprising:
a hook;
a first float traveling upon the fishing line;
an anchor;
the hook and anchor being configured to attach to a bait article;
a second float that is attachable to the fishing line;
wherein the first float elevates upon the fishing line to engage the second float unless (i) the anchor is embedded in the bait article, and (ii) the bait article is attached to the hook; and
an indicator that alerts a fisherman when the first float engages the second float.

2. The bait fishing assembly of claim 1 wherein the indicator is a valve that enables water to flood the second float.

3. The bait fishing assembly of claim 2 wherein the second float is hollow, having an air containing interior and wherein the valve enables water to enter the interior of the second float and air to exit from the second float.

4. The bait fishing assembly of claim 2 wherein the line is affixable to the second float so that the second float can be cast without sliding relative to the line.

5. The fishing lure of claim 1 wherein the indicator includes a switch that enables water to flood the first float.

6. The bait fishing assembly of claim 1 further comprising a rod attached to the fishing line.

7. The bait fishing assembly of claim 6 further comprising a reel attached to the rod and to the fishing line.

8. The bait fishing assembly of claim 1 wherein the second float has a channel and the fishing line passes through the channel so that the second float slides upon the fishing line.

9. The bait fishing assembly of claim 1 wherein the indicator is a light emitting device.

10. The bait fishing assembly of claim 9 wherein the light emitting device is positioned on top of the second float.

11. The bait fishing assembly of claim 9 wherein the lamp includes a pair of lamps.

12. The bait fishing assembly of claim 9 wherein the lamp is above the water surface.

13. The bait fishing assembly of claim 9 wherein the lamp is below the water surface.

14. The bait fishing assembly of claim 9 wherein the bulb shuts off when the bait article is lost.

15. The bait fishing assembly of claim 9 wherein the bulb changes color when the bait article is lost.

16. The bait fishing assembly of claim 1 wherein the indicator is a radio transmitter.

17. The bait fishing assembly of claim 1 wherein the indicator is an audible alarm.

18. The bait fishing assembly of claim 1 wherein the first and second float are spaced apart on the fishing line during casting.

19. The bait fishing assembly of claim 9 wherein the line is affixable to the first float so that the first float can be cast without sliding relative to the line.

20. The bait fishing assembly of claim 1 wherein the indicator includes an automatic valve.

21. The bait fishing assembly of claim 20 wherein the automatic valve is magnetically operated.

22. The bait fishing assembly of claim 20 wherein the automatic valve is optically operated.

23. A fishing apparatus for fishing with a bait article, comprising:
   a fishing line;
   a hook connected to the fishing line;
   a first float traveling upon the fishing line;
   an anchor, the hook and anchor each being configured to attach to a bait article;
   a second float, wherein the first float elevates upon the fishing line to engage the second float unless (i) the anchor is embedded in the bait article, and (ii) the bait article is attached to the hook; and
   an indicator that alerts a fisherman when the first float contacts the second float.

24. The bait fishing assembly of claim 23 wherein the indicator is a light emitting device.

25. A fishing apparatus for fishing with a bait article, comprising: a) a fishing line; b) a float attached to the fishing line; c) a hook on the fishing line; and d) an anchor attached to the float, the hook being attached to a bait article and the anchor being attached to the same bait article; wherein an elevation of the float upon the fishing line alerts the fisherman that the bait article is gone from the hook and anchor.

* * * * *